US008428528B2

(12) United States Patent
Sutton et al.

(10) Patent No.: US 8,428,528 B2
(45) Date of Patent: *Apr. 23, 2013

(54) RADIO COMMUNICATIONS SYSTEM DESIGNED FOR A LOW-POWER RECEIVER

(75) Inventors: Brian P. Sutton, West Linn, OR (US);
Jim Nelson, Lake Oswego, OR (US);
Paul Stadnik, Lake Oswego, OR (US);
Gary Rolison, Eagle Creek, OR (US);
Richard Berthelsdorf, Newberg, OR (US)

(73) Assignee: Biotronik CRM Patent AG, Baar (CH)

( * ) Notice: Subject to any disclaimer, the term of this patent is extended or adjusted under 35 U.S.C. 154(b) by 964 days.

This patent is subject to a terminal disclaimer.

(21) Appl. No.: 12/136,649

(22) Filed: Jun. 10, 2008

(65) Prior Publication Data
US 2009/0111390 A1    Apr. 30, 2009

Related U.S. Application Data

(63) Continuation-in-part of application No. 11/877,821, filed on Oct. 24, 2007.

(51) Int. Cl.
H04B 7/00    (2006.01)
H04B 1/18    (2006.01)
H04B 1/16    (2006.01)

(52) U.S. Cl.
USPC ....... 455/130; 455/41.2; 455/193.1; 455/227; 455/334; 455/343.1; 340/10.1; 340/13.27

(58) Field of Classification Search ........ 455/41.1–41.3, 455/132, 137, 139–140, 193.1–193.3, 313, 455/323–323, 343.1–343.4, 574, 127.5, 77, 455/130, 227, 334; 340/10.1, 13.24, 13.27, 340/13.33
See application file for complete search history.

(56) References Cited

U.S. PATENT DOCUMENTS

| 3,875,399 | A |   | 4/1975  | Teich |
| 3,947,769 | A |   | 3/1976  | Rousos |
| 4,646,090 | A | * | 2/1987  | Mawhinney ............... 342/44 |
| 5,349,173 | A |   | 9/1994  | Scheckel |
| 5,355,523 | A |   | 10/1994 | Ogawa |
| 5,553,099 | A |   | 9/1996  | Carroll |
| 5,854,593 | A | * | 12/1998 | Dykema et al. ........... 340/12.23 |

(Continued)

FOREIGN PATENT DOCUMENTS

| CA | 1149931    | 7/1983 |
| EP | 1225715    | 7/2002 |
| EP | 1821418 A2 | 8/2007 |

OTHER PUBLICATIONS

European Search Report dated Feb. 17, 2012 (16 pages).

(Continued)

*Primary Examiner* — Simon Nguyen
(74) *Attorney, Agent, or Firm* — ARC IP Law, PC; Joseph J. Mayo

(57) ABSTRACT

The invention relates to methods by which radio signals can be transmitted to, and received by, a radio receiver such that the receiver consumes very little power from a battery or energy source. The invention also relates to methods by which radio signals, modulated with data information, can be produced by a transmitter that consumes very little power. The invention is applicable not only to medical implants, but any application requiring a radio receiver to operate with very low power consumption.

33 Claims, 10 Drawing Sheets

U.S. PATENT DOCUMENTS

| | | | |
|---|---|---|---|
| 5,862,174 A | 1/1999 | Yokota | |
| 5,889,273 A | 3/1999 | Goto | |
| 5,960,042 A | 9/1999 | Chang | |
| 6,070,804 A | 6/2000 | Miyamoto | |
| 6,223,990 B1 | 5/2001 | Kamei | |
| 6,356,197 B1* | 3/2002 | Patterson et al. | 340/572.1 |
| 6,437,742 B1 | 8/2002 | Niesen | |
| 6,826,234 B1 | 11/2004 | Shoji | |
| 6,848,620 B2 | 2/2005 | Nakane | |
| 7,030,761 B2 | 4/2006 | Bridgelall | |
| 7,254,179 B2 | 8/2007 | Yoshida | |
| 7,369,118 B2 | 5/2008 | Lee | |
| 7,551,137 B2 | 6/2009 | Gagnon | |
| 7,702,387 B2 | 4/2010 | Stevenson | |
| 7,848,710 B2* | 12/2010 | Rofougaran | 455/75 |
| 7,877,068 B2 | 1/2011 | Atsumi | |
| 2003/0073421 A1* | 4/2003 | Ichimura | 455/313 |
| 2003/0186660 A1* | 10/2003 | Lee | 455/140 |
| 2005/0101251 A1 | 5/2005 | Kondo | |
| 2006/0273902 A1* | 12/2006 | Shafer et al. | 340/572.1 |
| 2007/0087717 A1* | 4/2007 | Handa et al. | 455/276.1 |
| 2007/0123186 A1* | 5/2007 | Asayama et al. | 455/188.1 |
| 2007/0260293 A1* | 11/2007 | Carpenter et al. | 607/60 |
| 2008/0258930 A1 | 10/2008 | Demichele | |
| 2009/0110035 A1* | 4/2009 | Sutton et al. | 375/146 |
| 2009/0111390 A1 | 4/2009 | Sutton | |

OTHER PUBLICATIONS

European Search Report dated Dec. 5, 2011. (5 pages).

* cited by examiner

RADIO COMMUNICATIONS SYSTEM DESIGNED FOR A LOW-POWER RECEIVER

This application is a continuation in part of U.S. patent application Ser. No. 11/877,821, filed 24 Oct. 2007, the specification of which is hereby incorporated herein by reference.

BACKGROUND OF THE INVENTION

1. Field of the Invention

The invention relates to a low power radio frequency receiver, a matching transmitter, a communication method for a low power receiver, and an electromagnetic signal.

2. Description of the Related Art

State-of-the-art battery powered medical implants must not only provide the prescribed therapy, but they must also be as small as possible, extremely reliable, and have a long service life. For example, the service life of cardiac pacemakers and implantable cardioverter defibrillators (ICDs) is expected to be seven years or more. Since all electronic devices consume electrical energy, medical implants with batteries that are not readily accessible, or easily replaced, must operate with minimal power consumption. Batteries in medical implants have a small and finite capacity to provide electrical energy, and as such, the operational longevity of devices being powered by them is dependent upon the rate at which the devices consume energy. Since implanted medical devices are required to operate for many years from a limited source of energy, the electronic circuitry in the devices must be designed to operate with minimal power consumption.

Present day medical implants often utilize radio telemetry to communicate patient medical data and implant status to a physician. This telemetry may occur frequently, as in the case of home monitoring applications, or it may occur less frequently, such as during patient follow-up examinations in a physician's office. In any event, the radio telemetry circuitry in the implant consumes battery power, and the hence impacts the longevity of the implant.

In the case of pacemakers and ICDs, the primary purpose of the implant is to regulate a patient's heartbeat and/or provide a life-saving shock to treat ventricular fibrillation. The implant's telemetry function is of secondary importance, and because of this, the battery power consumed by the radio telemetry circuitry must be minimal and have negligible impact on the service life of the implant.

In many battery-powered applications, the architectures of devices may employ special techniques to minimize power consumption. For example, devices may be designed to operate in several different modes, some of which may consume less power than others. Devices may have a "sleep" mode whereby they consume very little power or no power at all, and then one or more operational modes where the devices have more functional capability—at the expense of consuming more power. When operating in this manner to save battery power, the devices may change from one operational mode to another. Changes in operational mode may be determined by a time-sequence under the control of hardware or software. Changes in operational mode may also occur upon reception of a signal, or stimulus from an external device or sensor, or they may result from the reception of radio frequency commands transmitted to the device.

In a battery-powered device that changes operating modes upon the reception of radio frequency commands, the radio receiver in the device must be powered on, and remain on continuously, or nearly continuously, to ensure the device receives commands, and responds appropriately and in a timely fashion. The time of arrival of a transmitted command is usually not know by the device in advance, and so the receiver must be powered on in anticipation that a command may be transmitted to it at any time. As a consequence, the device's radio receiver will continuously consume power from the battery even when commands are not being transmitted to it.

The radio frequency electronics circuitry in a conventional receiver typically consumes a considerable amount of power, and hence the operational longevity of a battery-powered device is significantly reduced as the receiver remains powered on for long periods of time. Because a patient must undergo a surgical procedure to replace an implant when its battery power is nearly depleted, it is highly desirable to minimize the power consumption of radio frequency receivers employed in medical implants.

BRIEF SUMMARY OF THE INVENTION

This invention describes methods by which radio signals can be transmitted to, and received by, a radio receiver such that the receiver consumes very little power from a battery or energy source. The invention is applicable not only to medical implants, but any application requiring a radio receiver to operate with very low power consumption.

According to a further aspect, the invention facilitates implementing a radio communications system that features a wireless transceiver that consumes far less power than traditional transceiver architectures. Because the transceiver consumes far less power, it is particularly attractive for use in battery-operated medical implants such as pacemakers and ICDs.

Description of the Receiver

According to the invention, the requirements for a low-power receiver are fulfilled by a device comprising: at least one antenna, a resonant circuit, and a nonlinear device. Said antenna forms a part of the resonant circuit or it is directly or indirectly coupled to the resonant circuit, according to the invention.

Said antenna and resonant circuit are tuned to receive a first high frequency carrier of a predetermined first frequency F1, and a second high frequency carrier of a predetermined second frequency F2 simultaneously, which differ from each other by a predetermined intermediate or baseband frequency Fout=|F2−F1|.

Furthermore, a nonlinear device is directly or indirectly connected to the resonant circuit in a manner to cause mixing, or heterodyning, of the two carrier frequencies (F1 and F2), so as to produce an intermediate frequency (IF) or baseband signal Fout.

The low power receiver is adapted to operate according to the heterodyning method of down converting a high frequency signal to an intermediate frequency (IF) signal, or baseband frequency signal, by mixing the first high frequency carrier and the second high frequency carrier. The intermediate frequency signal, or baseband signal, produced by the mixing or heterodyning behaviour of the said nonlinear device, may be used directly as a signal to other electronic circuitry in the device, or the signal may be further demodulated to extract other information that may be contained in the resultant IF signal.

The low power receiver thus operates as a heterodyning receiver using the second high frequency carrier to replace the otherwise required local oscillator signal in a traditional super-heterodyne receiver architecture. This has the advantage that a very simple receiver design is used for reception of a high frequency carrier. Due to the simple design, which contains very few components, the power consumption of the receiver is very low.

Although the frequencies of the high frequency carriers may be very high, the frequency of the IF or baseband signal may be very low, if the difference between the frequencies of the high frequency carriers is small. In other words the frequencies of the high frequency carriers can be very close in value. Since the IF or baseband frequency is very low, numerous high frequency components and circuitry can be eliminated in the design and implementation of the low power receiver. For example, compared to a traditional super-heterodyne receiver that receives a single high frequency carrier, the following components can be eliminated: RF amplifiers, the local oscillator circuitry (and phase locked loop circuitry if a PLL is used), the local oscillator buffer amplifiers, and interstage impedance matching networks.

The resultant output signal may be an intermediate frequency (IF) signal, or it may be a baseband signal, and it may be the desired information to be received. In the case where the output signal is an IF signal, the IF signal may be further demodulated by subsequent stages to produce a baseband frequency signal that may contain the desired information to be received. The low power receiver thus is adapted to operate in a heterodyning fashion using the transmitted second high frequency carrier to replace an otherwise required local oscillator signal that is needed in a traditional super-heterodyne receiver.

In some traditional super-heterodyne receivers more than one intermediate frequency is used. In these multi-conversion receivers, different IF stages with different intermediate frequencies exist to obtain a better signal-to-noise ratio, improved image rejection, and finer tuning resolution. This requires additional local oscillators, mixers, and IF amplifier stages. If the application warrants it, the low power receiver can also employ additional IF stages similar to the methods used for traditional multi-conversion super-heterodyne receivers.

Another advantage of the invention is that because the low-power receiver's architecture is considerably simpler than a traditional super-heterodyne receiver, it uses fewer components, and hence the receiver can be made considerably smaller in size.

According to the invention, the intermediate frequency signal, or baseband signal, is received from a transmitter within a pair of high frequency carriers because the two high frequency carriers already contain the intermediate frequency, or baseband signal, in the superposition of two high frequency carriers. The intermediate frequency, or baseband signal, can also be seen as the beat frequency resulting from the mixing or heterodyning of the two high frequency carriers.

Since both high frequency carriers are received by the antenna, the high frequency carriers are superimposed within the antenna. The received second high frequency carrier signal replaces the locally generated local oscillator signal in a typical super-heterodyne receiver, and the nonlinear device in the invention replaces the mixer section used in a traditional super-heterodyne receiver.

In one embodiment of the invention, the low power receiver is adapted to convert the high frequency carriers to an intermediate frequency signal, and then demodulate the intermediate frequency signal with a demodulator so as to convert the IF signal into a baseband signal. The conversion of the high frequency carriers to the intermediate frequency signal is done simply by receiving the two high frequency carriers and mixing, beating, or heterodyning them in the nonlinear device.

The two high frequency carriers are both received by the antenna. The antenna is tuned to a middle frequency between the first and second high frequency carrier. The superposition and heterodyning of the two high frequency carriers produces the intermediate frequency signal. Thus the conversion from the high frequency carriers to the intermediate frequency signal results from the superposition and mixing, beating, or heterodyning that automatically occurs during reception.

To obtain an intermediate frequency signal in a traditional super-heterodyne receiver, it is necessary to mix the received high frequency carrier with a signal that is locally generated in the receiver at a different second frequency. The super-heterodyne receiver, as known in the art, therefore contains a local oscillator, which produces the second frequency. The intermediate frequency signal has a frequency equal to the difference between the carrier frequency and the frequency of the local oscillator. A mirror frequency, or image frequency, equal to the sum of the carrier frequency and the local oscillator frequency is also produced in the heterodyning of two signals. The process of producing the IF signal that is equal to the difference of the two high frequency signals is referred to as down-conversion. The process of producing the IF signal equal to the sum of the two high frequency signals is referred to as up-conversion.

In another embodiment of the invention, the low power receiver is adapted to convert the high frequency carriers directly to a baseband frequency signal. This baseband signal can then be used directly as a control signal by other sections of the device, or it can contain the desired communications signal information, or data, that was transmitted to the device.

In contrast to a traditional quadrature-amplitude modulation receiver, where two carriers of the same frequency, with a constant phase difference of $\pi/2$, are used, the low power receiver according to the invention receives two high frequency carriers at two different frequencies. A receiver for quadrature-amplitude modulated signals can also work with the super-heterodyne method, but has the same disadvantages, because it requires a local oscillator signal to obtain an intermediate frequency signal.

A high frequency signal, when used for transmission, is referred to as high frequency carrier. A high frequency carrier can be modulated with another signal, or may not be modulated, i.e. it may be just a continuous wave (CW) signal.

In a first embodiment of the high frequency carrier implementation for the low power receiver, the first and second high frequency carriers are not modulated (i.e they are CW carriers). The low power receiver is adapted to mix the two unmodulated carriers to obtain an intermediate frequency signal, or the baseband frequency signal. The resulting intermediate signal, or baseband signal, contains the desired information (that is, the data representing information) to be received. For example, the presence, or absence, of an intermediate frequency or baseband signal is, in itself, is a binary representation of data representing the desired signal information.

In a second embodiment of the high frequency carrier implementation for the low power receiver, the first or the second high frequency carrier is a reference carrier, which is not modulated (i.e. a CW carrier), and the other high frequency carrier is modulated with a data signal. The low power receiver is adapted to mix the unmodulated CW reference carrier with the modulated high frequency carrier to obtain a modulated intermediate frequency signal, or baseband frequency signal, that contains the data signal.

In a yet another embodiment of the high frequency carrier implementation for the low power receiver, the first and the second high frequency carriers are modulated with a data signal. The resultant intermediate frequency signal, or baseband signal, will contain the data signals that were modulated onto the high frequency carriers. The signal information is regained by demodulating the received intermediate frequency or baseband signal. This has the advantage that one of the high frequency carriers replaces an otherwise needed local oscillator signal, from which the intermediate frequency is produced.

In a first embodiment of the antenna configuration, the receiver comprises two separate antennas each tuned to receive only one of the high frequency carriers. The receiver then combines and mixes, or heterodynes, the high frequency carriers to produce the intermediate frequency or baseband signal.

In a second embodiment of the antenna configuration, the receiver comprises only one antenna with which it receives the two high frequency carriers. In this embodiment the two high frequency carriers are combined and superimposed in the antenna. The receiver mixes, or heterodynes, the already combined high frequency carriers to produce the intermediate frequency or baseband signal.

It should be noted that the amplitudes of the transmitted high frequency carriers may be equal or different. If the antenna or the resonant circuit is tuned to the first high frequency carrier, the received signal may be higher than for the second high frequency carrier. In this case it may be useful to transit a greater amplitude or stronger signal for the second high frequency carrier to obtain adequate signal amplitudes for both high frequency carriers within the receiver.

In one embodiment of the invention the low power receiver comprises a first band-pass filter, which is connected directly, or indirectly, to the output of the antenna. In this embodiment the first band-pass filter has a pass band that is corresponds to the carrier frequencies. The band-pass filter will attenuate unwanted signals at frequencies outside the frequency band of the desired transmitted signals. Attenuating undesired signals, by filtering, will reduce the potential for interference and improve the quality and reliability of the desired communications link.

It should be noted that the first band-pass filter may also have a pass-band around a frequency between the first and second high frequency carrier frequencies. In this case both high frequency carriers can pass through the band-pass filter with similar attenuation. It is desirable that the filter's attenuation to the desired high frequency carriers be as low as possible.

It is also possible that the first band-pass filter may be tuned to one high frequency carrier frequency, and the antenna may be tuned to the frequency of the same high frequency carrier. The attenuation for this high frequency carrier is lower then for the other high frequency carrier.

It should be noted that more than one first band-pass filter can be employed to obtain steeper roll-off and greater attenuation for signals outside the filter's pass band. Each high frequency carrier can have a respective band-pass filter.

In a further embodiment of the invention, the low power receiver incorporates a second band-pass filter, or a low-pass filter, that is connected to the output of the nonlinear device. The second band-pass filter, or low-pass filter, has a pass band corresponding to the intermediate frequency or the baseband frequency. The second band-pass filter, or low-pass filter, is used to eliminate or attenuate the high frequency carrier signals and unwanted signals resulting from the mixing, or heterodyning, process.

In still another preferred embodiment, the second band-pass filter, or low-pass filter, is connected to an intermediate frequency (IF) or baseband amplifier. In this embodiment the low power receiver is adapted to filter and to amplify the desired IF or baseband signal. In this embodiment, the IF or baseband amplifier is used to obtain a higher signal level for the further processing of the received signal. The filter and amplifier may also serve to provide impedance matching between sections of the receiver for maximum signal power transfer. The amplifier may also have a specific frequency response and operate in a fashion similar to a bandpass filter, or low-pass filter, to further attenuate unwanted signals.

In a further preferred embodiment of the invention the nonlinear device or the baseband amplifier is connected to a level detector circuit. In this embodiment the low power receiver is adapted:

1. to analyse the level of the IF or baseband signal, or the filtered and amplified IF or baseband signal, with the level detector circuit, and
2. to produce a wakeup signal depending on the level of the IF or baseband signal, or the filtered and amplified IF or baseband signal, with the level detector circuit.

This embodiment of the invention facilitates implementing a low power receiver that can be operated continuously, nearly continuously, or be turned on for long intervals of time, while consuming minimal power from a battery. When the low power receiver detects a control signal from an external transmitter, it can wake up other circuitry in the device, or enable other programmed operating routines, that may have been powered-off to conserve battery power. The circuitry and/or operating routines can encompass device functions that require greater power consumption from the battery, such as data communications circuitry, processor circuitry, or the like.

In one embodiment of the invention, the signal from the output of the nonlinear device, the IF output, or baseband amplifier output, is connected to a data detection circuit. The low power receiver is adapted to convert the IF or baseband signal, or the filtered and amplified IF or baseband signal, with the data detection circuit, into a digital data signal, and to output the digital signal to other circuitry for subsequent processing. This data signal can be used to convey information to the device such as identification information, operating instructions, or software or firmware updates.

Another embodiment of the low power receiver, according to the invention, comprises a high frequency amplifier, which is connected to the antenna or the resonant circuit. The high frequency amplifier is adapted to amplify the first and second high frequency carriers. The high frequency amplifier may also provide filtering of the desired high frequency carrier signals to reduce interference from unwanted signals in the adjacent radio spectrum.

Another possibility is that the high frequency amplifier is connected between the first band-pass filter and the nonlinear device. In this case the amplifier feeds the bandpass filtered and amplified signal to the nonlinear device.

In the case where the low power receiver contains two antennas, or two resonant circuits, there may be two or more high frequency amplifiers employed, each connected to one antenna or resonant circuit.

In another embodiment of the invention, the low power receiver is adapted to receive more than two high frequency carriers at different frequencies, and to obtain an output signal from intermodulation products produced by nonlinear mixing of the high frequency carriers. In this case the output signal is generated by nonlinear mixing of high frequency carriers, i.e. Fout=($nF_1 \pm mF_2 \pm pF_3 \pm \ldots$) where n, m, p, ... are integers, and F1, F2, F3 are high frequency carriers.

It should be clear that if more than one intermediate frequency is to be received, there may be several band-pass filters applied in parallel.

In a preferred embodiment, the nonlinear device is a single diode, an array of diodes, a switching device, or a device with a strong $2^{nd}$ order transfer function.

There are several methods that can be used to obtain a device with the needed $2^{nd}$ order transfer function for mixing, beating, or heterodyning. It should be noted that a device exhibiting a strong second-order transfer function provides an efficient mechanism for converting two transmitted RF signals to an intermediate frequency signal or baseband signal. Alternatively, any ON-OFF switching device can also be used for mixing, heterodyning, or detection, since such devices also exhibit second-order transfer function characteristics. If more than two high frequency carrier signals are transmitted, other nonlinear transfer functions, such as $3^{rd}$ order and higher, are efficient for the detection process.

When an ON-OFF switching device is used as the nonlinear device, it can also provide signal detection. In this case the output of the nonlinear device is the desired output signal.

In another embodiment of the invention the low power receiver is adapted to receive spread spectrum carriers. Spread spectrum techniques may utilize frequency hopping, or direct sequence spreading, or any other spread spectrum techniques known in the art.

Spread spectrum techniques result in spreading the transmitted energy over a wider frequency band. This can be important when government regulatory agencies impose limits on the maximum allowable radiated power limits for the high frequency carriers. In some countries, the regulatory agencies allow spread spectrum signals to be transmitted at power levels higher than signals that do not employ spread spectrum techniques. It may be beneficial to use spread spectrum techniques to transmit the signals at higher power levels so as to overcome radio frequency propagation losses. Transmitting at higher power levels to overcome radio frequency propagation losses improves the performance and reliability of the communications link. Another benefit is that the signals are more resistant to transmission impairments such as multipath fading and interference.

There are two fundamental methods for producing spread spectrum signals: (1) direct-sequence spread spectrum, and (2) frequency hopping spread spectrum.

Direct-sequence spread-spectrum transmissions multiply the data being transmitted by a "pseudorandom noise" signal. This pseudorandom noise signal (PN) is a sequence of 1 and −1 values, called "chips", operating at a rate much higher than that of the original data signal. Multiplying the data to be transmitted by a high-rate PN sequence causes the energy of the original signal to be spread over a much wider frequency band. Since the sequence of the chips produced by the transmitter is known by the spread spectrum receiver, the receiver can use the same PN sequence, to counteract the effect of the pseudorandom noise sequence on the received signal, in order to reconstruct the original information.

In one preferred embodiment of the invention, direct-sequence spread spectrum techniques may be employed if the two transmitted high frequency carriers use the same PN chip sequence at the same period in time. When spreading in this manner, the instantaneous intermediate frequency, or baseband frequency, recovered by the low-power receiver will be the same as if spreading had not been employed. The low-power receiver will recover the transmitted signal information.

In frequency hopping spread spectrum systems, the transmitter's carrier frequency hops over a band of frequencies using a specific hop sequence. The associated spread spectrum receiver also tunes over the same frequency band using an identical frequency hop sequence at the same period in time. In this way, the transmitter and receiver are always operating on the same RF frequency, or channel, and hence the receiver is able to recover the transmitted information.

In one preferred embodiment of the invention, spread spectrum frequency hopping techniques may be employed if the two transmitted high frequency carriers frequency hop using the same hop sequence and hop at the same, or nearly same, instant in time. It is desirable that the two high frequency carriers maintain their desired frequency difference relationship while hopping during the spectrum spreading sequence. When frequency hopping in this manner, the intermediate frequency of the two high frequency carriers will maintain the desired relationship and it will be possible to recover the desired control signal or transmitted data with the low-power receiver.

In still another embodiment of the invention, the transmitter is adapted to transmit at least two pairs of high frequency carriers, and the first pair of high frequency carriers has a difference in frequency that is equal to the difference in frequency of the second pair of high frequency carriers. Both high frequency carrier pairs will produce the same intermediate frequency, or beat frequency, in the receiver, i.e. Fout=|F2−F1|=|F4−F3|. The two pairs of transmitted high frequency carriers convey the same signal information, and hence they are redundant. Thus the desired signal information is radiated twice and received twice since the superposition of the first pair of high frequency carriers is redundant with the superposition of the second pair of high frequency carriers. Transmitting a second pair of signals, that contain redundant information, is advantageous in communications links that experience multipath fading. If one of the pair of carriers experiences destructive interference due to multipath fading, it is unlikely the second pair will be affected since their wavelengths will be different; and multipath fading is dependent upon the carrier wavelength. As a consequence, the receiver will be able to recover the transmitted information and maintain a reliable communications link even in the presence of severe multipath fading. Therefore the communication link established with the proposed low power receiver is more resistant to link failure due to multipath fading. This can be attributed to the redundancy of the desired signal in two pairs of high frequency carriers.

Description of the Transmitter

According the invention, the signals required for the aforementioned low power receiver are fulfilled by a transmitter comprising at least one antenna, and at least one high frequency amplifier, and at least one signal source providing at least two high frequency carrier signals. The transmitter is adapted to transmit a first high frequency carrier and a second high frequency carrier signal simultaneously. The high frequency carrier signals are adapted to be down-converted to an intermediate frequency signal or baseband frequency signal in the low power receiver.

According to the invention, the transmitter produces a pair of radiated high frequency carrier signals such that the signals contain an intermediate frequency signal, or a baseband signal, when superimposed. The intermediate frequency, or baseband frequency, Fout, is the difference frequency of the high frequency carriers F1 and F2, i.e. Fout=|F2−F1|. This has the advantage that when the two high frequency carriers are received by the low power receiver, the intermediate frequency signal is already contained in the superposition of the two high frequency carriers, wherein the otherwise needed local oscillator signal required in a super-heterodyne receiver for obtaining the intermediate frequency signal is replaced by one of the high frequency carriers. Thus a simplified receiver design can be utilized, which contains less high frequency electronic circuitry, and thus can be designed to consume very low power. The transmitter disclosed in the invention provides a signal to replace the local oscillator signal that is required in receivers based upon the super-heterodyne and homodyne principles of operation.

It should be noted that the amplitude of the two high frequency carriers may be equal or may be different, depending on the transmitter and/or receiver design.

The transmitter can comprise one radio frequency amplifier and antenna for all high frequency carriers, or one radio frequency amplifier and antenna for each radiated high frequency carrier. Alternatively, the transmitter may employ one radio frequency amplifier for each separate high frequency carrier, and combine the outputs of the amplifiers into one or more antennas.

It may be desirable to use a separate amplifier for each high frequency carrier to simplify the design of the transmitter. By using a separate amplifier for each high frequency carrier, the amplifiers' linearity requirements are less critical, and the amplifier may be less costly to manufacture. High frequency amplifiers that simultaneously amplify multiple carrier signals require a high degree of linearity to prevent intermodulation and distortion of the signals. In addition, high frequency amplifiers that only amplify one high frequency carrier at a time can be designed to be more power-efficient than amplifiers designed to simultaneously amplify more than one carrier signal. Amplifiers operating with high power efficiency are smaller, lighter in weight, easier to cool, and cost less to manufacture than high-linearity amplifiers.

In one embodiment of the transmitter according to the invention, the transmitter does not include a modulation unit. The transmitter is adapted to only transmit two high frequency continuous wave (CW) carrier signals. Either one or both CW carrier signals may be enabled or disabled as desired. The presence, or absence, of one, or both, CW carrier signals can be used as a command signal to the low power receiver In another embodiment of the transmitter according to the invention, the transmitter can transmit a signal containing information to the receiver. The transmitter comprises at least one modulation unit that is adapted to modulate at least one high frequency carrier signal with a data signal. The data signal may be either a digital or an analog signal. The data signal can either be a data stream, or repeated information like an identification code. The carriers may be amplitude modulated (AM), ON-Off Key modulated (OOK), frequency modulated (FM), phase modulated (PM), quadrature-amplitude modulated (QAM), or any combination thereof.

In another embodiment of the transmitter according to the invention, both high frequency carriers may be modulated. The carriers may be amplitude modulated (AM), ON-Off Key modulated (OOK), frequency modulated (FM), phase modulated (PM), quadrature-amplitude modulated (QAM), or any combination thereof. The data signal may be either a digital or an analog signal. The data signal can either be a data stream, or repeated information like an identification code. The modulation technique can add up to a combined modulation in the intermediate frequency signal as further described below.

In one embodiment of the invention the transmitter is adapted to quadrature-amplitude modulate the data signal on at least one of the high frequency carriers.

If the data signal is quadrature-amplitude modulated on one high frequency carrier, each transmitted symbol can convey more than one data bit. There are 8 QAM, 16 QAM, up to 256 QAM methods known in the art.

In another embodiment of the invention, one high frequency carrier may be amplitude modulated, and the second high frequency carrier may be phase modulated. The resulting intermediate frequency signal, which is the superposition of the two high frequency carriers, is then a QAM signal or pseudo-QAM signal.

The digital data may be pre-processed, or filtered, before it is modulated onto the high frequency carriers. Known pre-processing steps include analog filtering, and/or digital filtering, to reduce the spectral occupancy of the signal information. Filter types may include Gaussian, Butterworth, Root-raised Cosine, etc. Examples for digital modulation techniques that may be used include, but are not limited to amplitude modulation (AM), On-Off Keying (OOK), frequency-shift keying (FSK), minimum-shift keying (MSK), Gaussian-frequency-shift keying (GFSK), Gaussian-minimum-shift keying (GMSK), phase-shift keying (PSK), orthogonal frequency division multiplexing (OFDM), which is also a QAM technique, quadrature phase-shift keying (QPSK), etc.

In still another embodiment of the invention, the transmitter is adapted to transmit at least two pairs of high frequency carriers, and the first pair of high frequency carriers has a difference in frequency that is equal to the difference in frequency of the second pair of high frequency carriers. Both high frequency carrier pairs will produce the same intermediate or beat frequency, in the receiver, i.e. Fout=|F2−F1|=|F4−F3|. The two pairs of transmitted high frequency carriers may be modulated using the methods described earlier, and convey the same signal information, and hence they are redundant. Thus the desired signal information is radiated twice and received twice since the superposition of the first pair of high frequency carriers is redundant with the superposition of the second pair of high frequency carriers.

Transmitting a second pair of signals, that contain redundant information, is advantageous in communications links that experience multipath fading. If one of the pairs of carriers were to experience destructive interference due to multipath fading, it is unlikely the second pair will be affected since their wavelengths will be different; and multipath fading is dependent upon the carrier wavelength. As a consequence, the receiver will be able to recover the transmitted information and maintain a reliable communications link even in the presence of severe multipath fading. Therefore the communication link established with the low power receiver is more resistant to communication link failure caused by multipath fading. This can be attributed to the redundancy of the desired signal in two pairs of high frequency carriers.

In one embodiment of the invention, the transmitter is adapted to transmit the data using spread spectrum techniques. This has the advantage that the radiated electromagnetic energy is spread over a broader frequency band, and therefore the average power spectral density of the radiated energy is reduced. This is especially important where state regulations on radiated power limit the maximum legal transmitter power level. Transmitters employing spread spectrum techniques are often allowed to transmit at higher power levels than those that do not use spread spectrum. Transmitting at higher power levels is advantageous for increasing the operating range of the communications link, or increasing the link reliability, or both.

Another benefit of using spread spectrum techniques is that the signal is harder to detect, and therefore more secure for sensitive data. In some cases the spread spectrum signal is not detectible unless the receiver knows the spread spectrum technique a priori.

Description of a Low Power Transmitter

A further aspect of the invention is a low power transmitter comprising an antenna and a nonlinear device coupled to the antenna. The nonlinear device comprises a signal input for receiving signals having at least two different frequencies F1 and F2 and a signal output. The nonlinear device is adapted to generate at least signals having two further frequencies $F_{21}$ and $F_{12}$ from received signals F1 and F2 and to couple the signals having said at least two further frequencies $F_{21}$ and $F_{12}$ back to the antenna. Thus the majority of the circuitry in the low power transceiver is passive and does not require a source of DC power to operate. The only DC power required is that necessary to modulate signals $F_{21}$ and $F_{12}$ (or, in general terms: $F_{mnp}$) with the data signal to be transmitted. Since this function consumes very little power, the low power transmitter consumes very little power from the implant's battery when it is transmitting. This is a considerable advantage over conventional transmitter architectures.

However, the nonlinear device of the transmitter may be connected to an amplifier or may be part of an amplifier in order to increase the transmitter's range.

According to preferred embodiments, the low power transmitter may be adapted to perform on-off-keying (OOK) to transmit amplitude modulated (AM) signals or to perform frequency shift keying (FSK) as pointed out below.

Description of a Low Power Transceiver

The basic elements comprising the invention are: a non-implanted transceiver as described above that simultaneously transmits multiple RF signals, and an implantable low-power transceiver that employs nonlinear circuitry to simplify the transceiver's architecture and minimize power requirements.

The non-implanted transceiver utilizes conventional RF circuitry and techniques to implement the necessary receiver and transmitter functions, but it is unique in that it simultaneously transmits multiple RF carrier signals that may be modulated by a data signal. This transceiver, which may be part of a physician's programmer, or bedside monitor, is typically powered by the AC mains, and hence its size and power consumption are not as critical as the low-power transceiver that is implanted in a patient.

The implanted transceiver is unique in that it utilizes the nonlinear behaviour of circuit elements to simplify its architecture. Simplifying the implanted transceiver's architecture can make the transceiver very power-efficient, physically small, and highly reliable. These attributes are extremely desirable in medical implants such as pacemakers and ICDs. In addition to being a low power receiver, the low power transceiver can also act as a low power transmitter.

A low power transceiver according to a preferred embodiment of the invention comprises a low power transmitter according to the invention and a low power receiver according to the invention.

Preferably both, the low power transmitter and the low power transceiver each comprise a nonlinear device that is connected to a single antenna by means of a signal combiner/splitter for connecting said receiver's nonlinear device or said transmitter's nonlinear device to said antenna.

Description of the Modulation and Signal

The following modulation techniques apply to the communication method according to the invention.

1. None of the simultaneously transmitted high frequency carriers may be modulated. The carriers, (F1 and F2), may be high frequency continuous wave (CW) signals. In this case, the desired signal is the frequency difference signal, i.e. Fout=|F2−F1|.
2. It should be noted that either one high frequency carrier, or more high frequency carriers, may be modulated. The carrier, or carriers, may utilize amplitude modulation (AM), On-Off Key modulation (OOK), frequency modulation (FM), phase modulation (PM), quadrature-amplitude modulation (QAM), or any combination of AM, OOK, FM, PM, or QAM modulation techniques.
3. This data signal may be a data stream or a single repeated sequence such as an identification code.
4. The data signal can either be an analog signal or a digital signal.
5. The high frequency carrier, or carriers, may be modulated with a cyclic signal, which can be frequency coded to address one specific receiver. This would be one bit of information —either the frequency of the cyclic signal matches a predetermined frequency or not.
6. In one embodiment of the communication method according to the invention, one high frequency carrier is amplitude modulated with a first part of the signal information, and a second high frequency carrier is phase modulated with a second part of the signal information, wherein the resulting intermediate frequency signal, which is the superposition of the two high frequency carriers, is quadrature-amplitude modulated and contains the full signal information.
7. The high frequency carrier signals may also employ spread spectrum techniques such as direct sequence spread spectrum or frequency hopping techniques.

The invention has been described in different embodiments. It should be noted that the features of the different embodiments can be combined, if they do not exclude each other, or if it is otherwise specified.

BRIEF DESCRIPTION OF THE DRAWINGS

The foregoing, and other objects, advantages, and novel features of the present invention can be understood and appreciated by reference to the following detailed description of the invention, taken in conjunction the accompanying drawings, in which.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
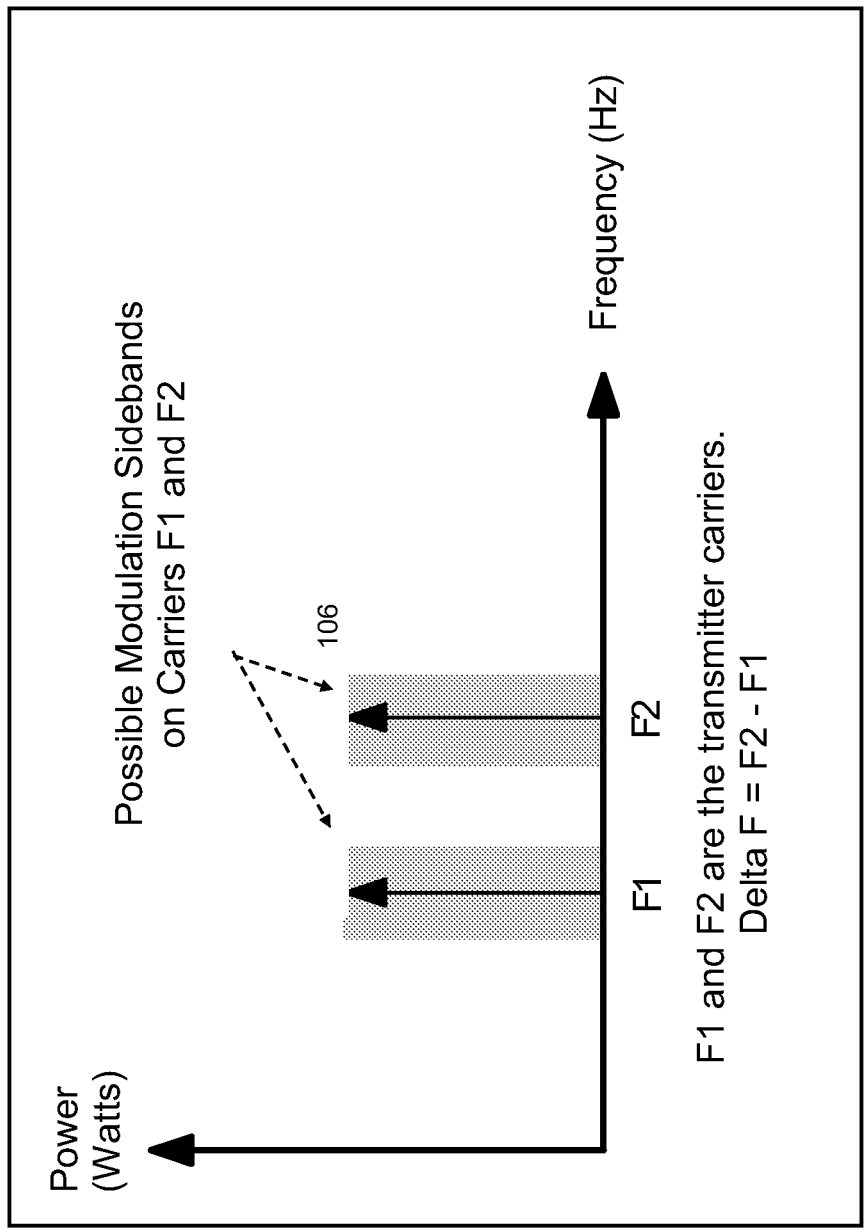
FIG. 1 shows schematically a frequency spectrum of a transmitter with two carriers.

FIG. 1 shows, schematically, the frequency spectrum of a transmitter with two high frequency carriers at different frequencies F1 and F2. The high frequency carriers may not have modulation sidebands (i.e. they may be only CW carriers), or one, or both carriers may have modulation sidebands 106. None, one, or all high frequency carriers may be modulated. In the following the high frequency carriers may be referred to simply by carriers. The carriers of two frequencies mix with each other and produce new signals at the frequency F1+F2 and at delta F=|F2−F1|. Delta F can be used for a low power receiver design, because although F1 and F2 may be very high, delta F can be very low. The signal at frequency delta F is called intermediate frequency signal. If delta F is very small, it may also be referred to as a baseband signal. Because of this relationship between two carriers, or more than two carriers, the design of the receiver can be simplified as described further below.

Figure 2:
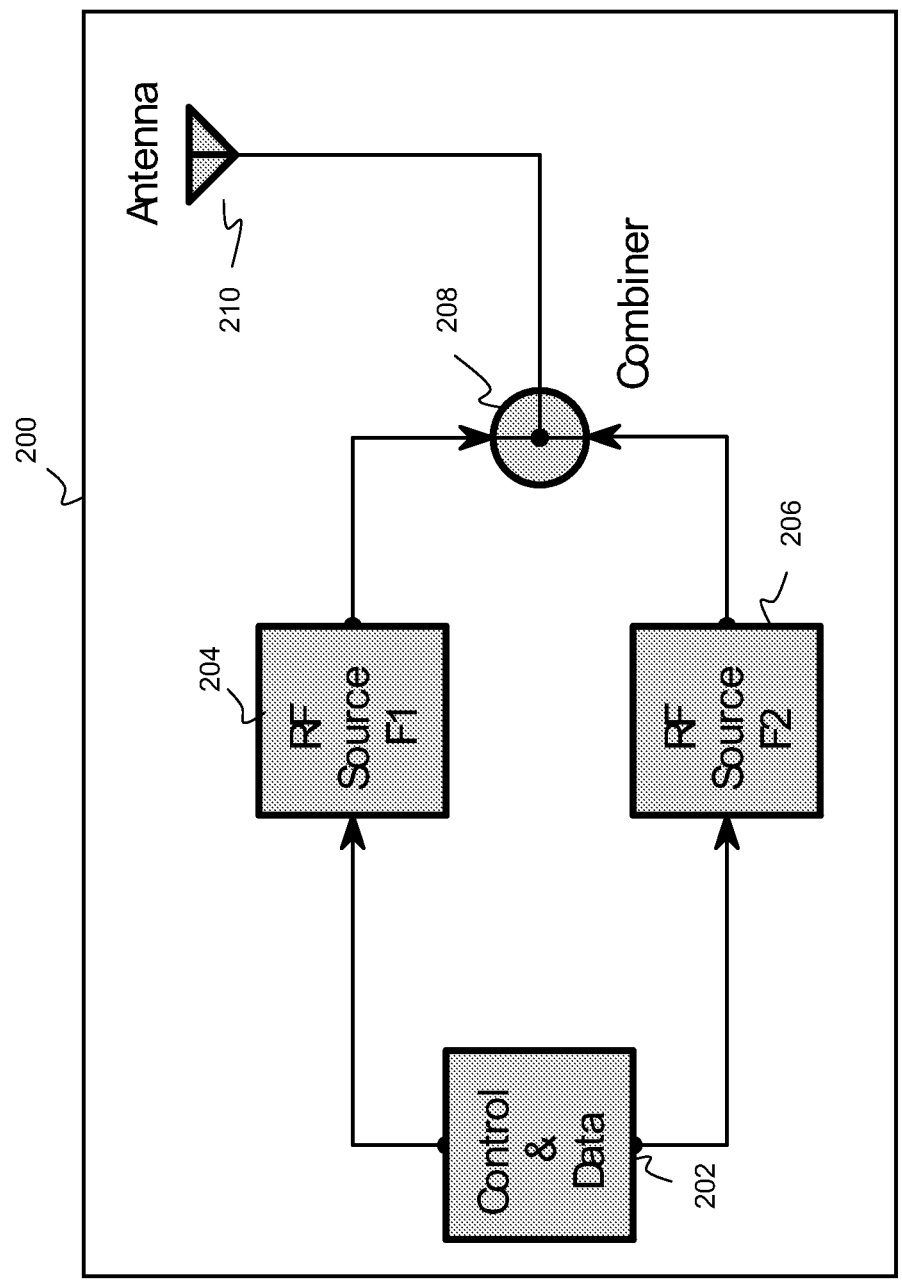
FIG. 2 depicts schematically a possible simplified design of a transmitter 200 according to one embodiment of the invention.

FIG. 2 schematically depicts a possible simplified design of a transmitter 200 according to one embodiment of the invention. The transmitter is adapted to simultaneously transmit two different carriers at a first high frequency F1, and a second high frequency F2, which is different from the first frequency. In this embodiment the transmitter 200 comprises a control and data unit 202 to provide reference frequencies, and is optionally adapted to perform analog and/or digital baseband modulation. The transmitter further comprises two high frequency sources 204 and 206, which are connected to the control and data unit 202 at their inputs. These high frequency sources generate the two carriers at different frequencies. The first radio frequency source 204 generates the first carrier at the frequency F1 and the second high frequency source 206 generates the second carrier at the frequency F2. The high frequency sources 204, 206 are connected at their respective output to a combiner 208, which linearly combines the two high frequency signals. The combiner 208 is connected to an antenna 210, which radiates the high frequency signals over the air. The high frequency sources 204 and 206 may utilize separate high frequency amplifiers to increase the signal power of the carriers prior to being combined. Optionally, the combiner 208 may also include high frequency amplifiers to further increase the power level of the signals to be transmitted.

In another embodiment of the antenna configuration, the combiner stage 208 is not used, and the high frequency sources 204, and 206, are individually connected to separate antennas.

In one embodiment, one high frequency source 204 is adapted to modulate a baseband signal to the high frequency carrier and the other high frequency source 206 is adapted to produce a continuous wave (CW) high frequency signal, which acts as a reference signal for a receiver. In another embodiment both high frequency sources 204 and 206 are both adapted to modulate baseband signals onto the two carriers of different high frequencies.

In one embodiment of the invention one high frequency carrier is amplitude modulated and the other high frequency carrier is phase modulated. The resulting intermediate frequency produced in the low power receiver, which is the superposition of the two carriers, is a quadrature-amplitude modulated (QAM) signal.

In another embodiment of the invention, more than one pair of high frequency sources are provided. The sources may be combined and transmitted using one antenna, or the sources may not be combined, and each source will transmit its signal from a separate antenna, i.e. one antenna for each source. Transmitting more than one pair of signals can be used to improve the reliability of the communications link by reducing the susceptibility to signal fading caused by multipath interference.

In one embodiment of the invention the control and data unit is a programmable controller, an application specific integrated circuit (ASIC), or a digital signal processor (DSP), or a combination thereof. In another embodiment the high frequency sources are numerically controlled oscillators (NCO), crystal oscillators, or phase-locked frequency synthesizers.

Figure 3:
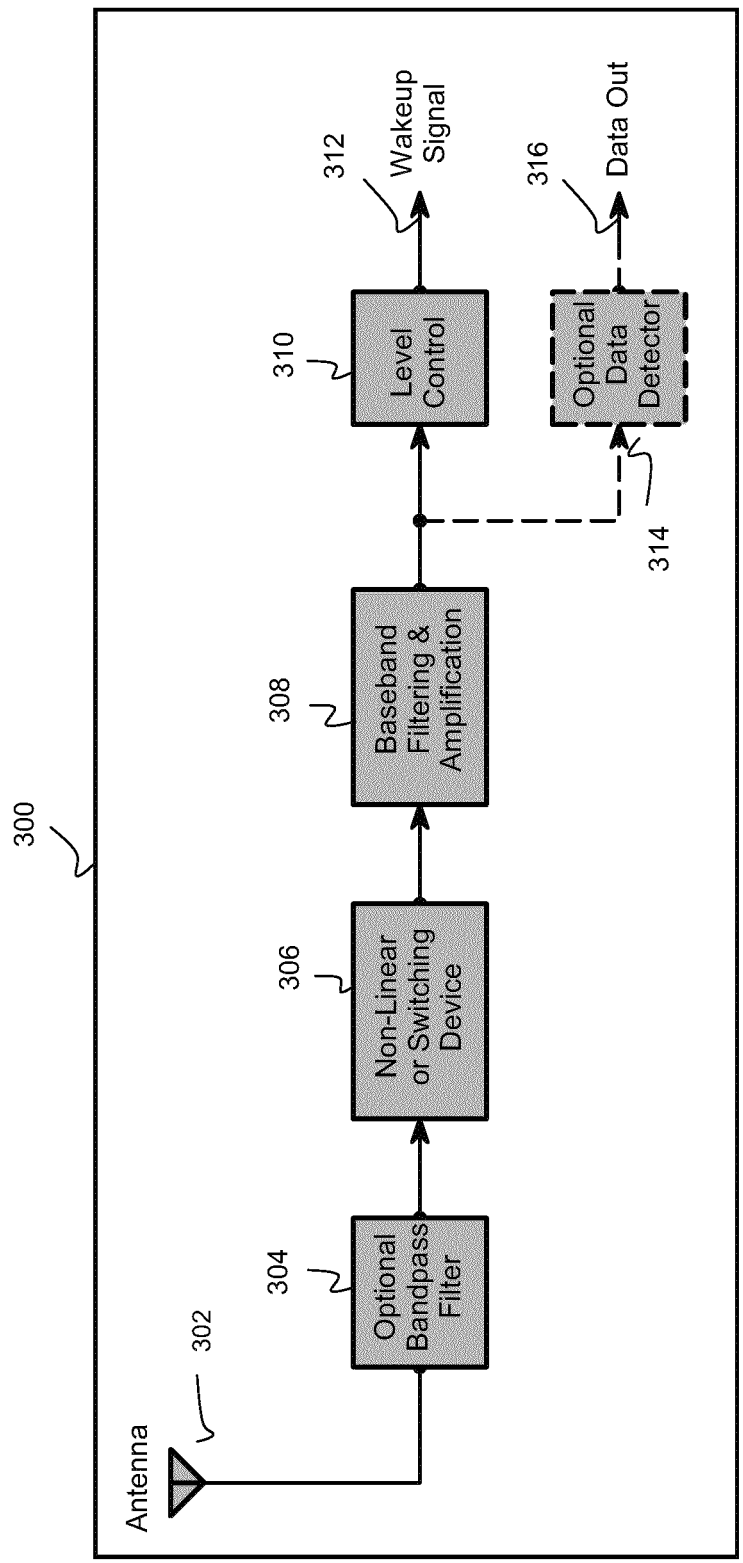
FIG. 3 shows an embodiment of a simplified schematic design of a receiver 300 according to the invention.

FIG. 3 shows an embodiment of a simplified schematic design of a receiver 300 according to the invention. In this embodiment the receiver comprises an antenna 302, which is connected to a first band-pass filter 304 being connected to a nonlinear or switching device 306. The nonlinear or switching device is connected to an intermediate frequency band-pass filter, or a baseband filter, and an amplification unit 308. This unit is connected to a level detector unit 310, and to a data detection unit 314.

The antenna is tuned to receive two high frequency carriers at frequencies F1 and F2, which are of similar frequencies. The two high frequency carriers are fed to the first band-pass filter 304. This bandpass filter has a narrow pass band around a middle frequency between F1 and F2. The filter is designed to allow both high frequency carriers to pass through the filter with little attenuation, while attenuating unwanted signals outside the filter's pass band.

The filtered high frequency signals are fed to the nonlinear or switching device 306. The superposition and mixing, beating, or heterodyning of the two high frequency carriers in the nonlinear, or switching device, 306 results in two additional frequencies, Fsum=F1+F2, and Fout=|F2−F1|. The desired intermediate frequency signal, or baseband signal, is the signal at frequency Fout=|F2−F1|. The IF signal, or baseband signal, is fed to the IF filter, or baseband filter, and amplification unit 308. The IF or baseband filter passes the desired signal with very little attenuation, and suppresses the residual high frequency components at F1 and F2, as well as at Fsum.

The filtered and amplified IF or baseband signal is fed to the level detector unit 310, which detects if the signal exceeds a predetermined level. If the predetermined level is exceeded the level detector unit generates a wake up signal 312 to activate other parts of the device, e.g. a more power consuming communication device and/or a corresponding processor can be activated. The signal is possibly also fed to a data detection unit 314. In one embodiment of the invention the data detection unit may detect and output a data signal 316. Alternatively, the output of the data detection unit may also be used as a wakeup signal.

In one embodiment the data signal is an identification code for the device in which the receiver is installed. Thus only the receiver with the matching identification code may wake up when a transmitter transmits the corresponding identification code. In another embodiment of the invention, the transmitter may transmit a broadcast message to all receivers within reception range, and all devices will respond to the transmitted message. In yet another embodiment of the invention, the data detection unit can feed the data from the received baseband signal to other parts of the device to allow the device to receive data from a transmitter.

Figure 4:
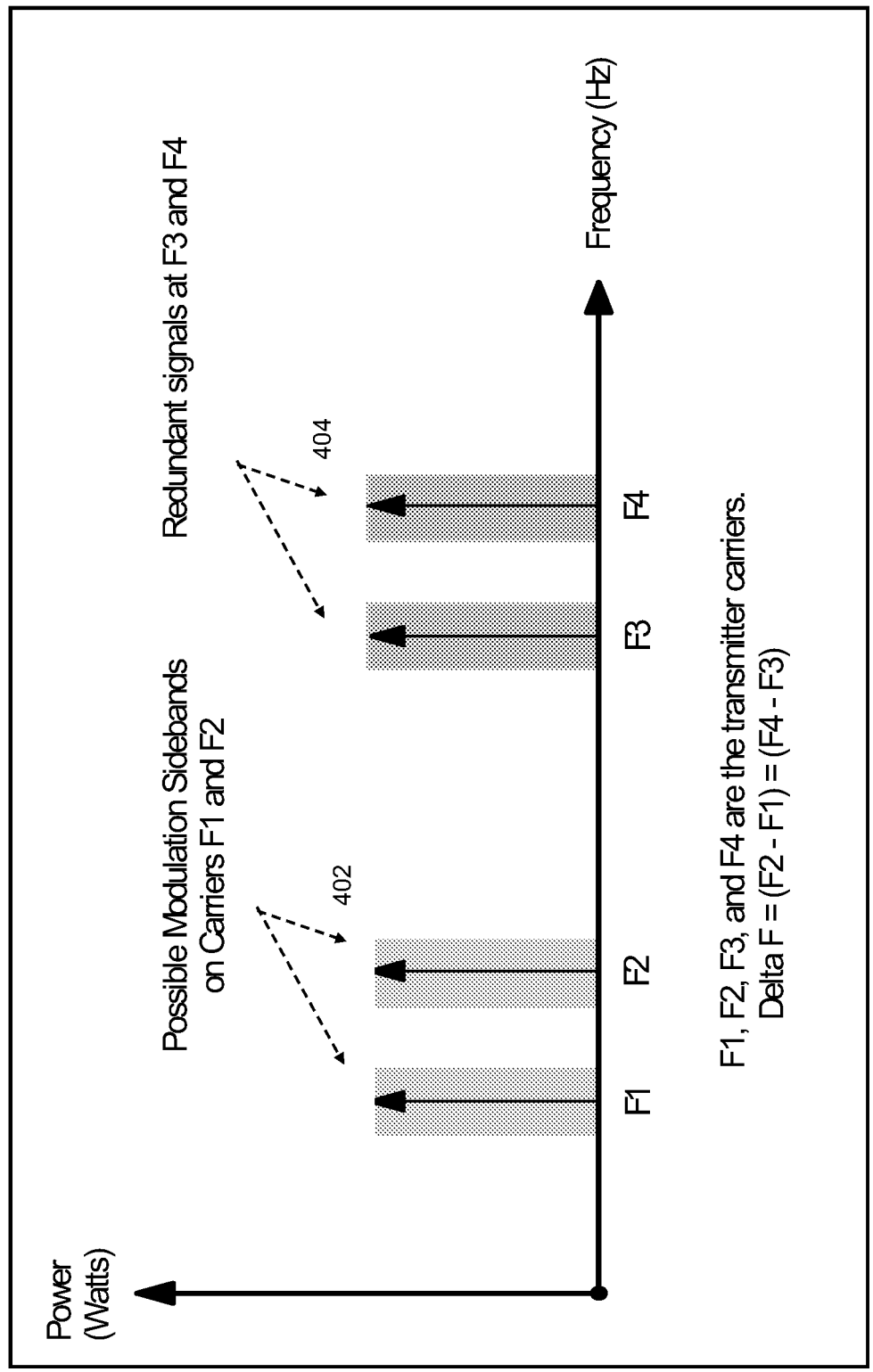
FIG. 4 shows schematically a transmitter frequency spectrum of another embodiment of the invention.

FIG. 4 shows a schematic of the transmitter frequency spectrum of another embodiment of the invention. With this implementation of the invention, it is possible to reduce communication link failures due to multipath fading. Multipath fading means that radio signals can be severely attenuated at certain locations due to destructive interference caused by signal reflections from nearby structures.

In this embodiment two pairs of high frequency carriers, (four signals), 402 and 404, are used to transmit data. The two pairs of high frequency carriers 402 and 404 have the same frequency difference delta F.

$$(F4-F3)=(F2-F1)=\text{delta } F.$$

In the receiver, the intermediate frequency, delta F, is received due to the above described superposition and heterodyning of each pair of high frequency carriers. Thus on the receiver side the two high frequency carrier pairs have the same intermediate or baseband frequency. Although the receiver receives only one intermediate frequency signal, or baseband frequency signal, it consists of two pairs of independent high frequency signals due to superposition.

In this embodiment of the invention the high frequency carrier pairs F1, F2 and F3, F4 carry the same signal information. That means they are redundant and thus the information in the resulting intermediate frequency signals is redundant. When the signals are received at the receiver without reflections, or multipath interference from nearby structures, the resultant received intermediate frequency signal is a superposition and heterodyning of the two pairs of high frequency carriers. When multipath fading occurs on one high frequency carrier pair, the receiver will still receive the other high frequency carrier pair, and can receive the signal information on its respective intermediate frequency signal. It is very unlikely that multipath fading occurs on the two high frequency pairs at the same receiver location since the high frequency carrier pairs are in a different frequency bands and therefore their wavelengths are different. Although the communication link may fail with the F1 and F2 pair, the link remains established by F3 and F4 pair. The same situation is true if the F3 and F4 pair experience multipath interference. The receiver will likely receive the desired signal information transmitted by the F1 and F2 pair of high frequency carrier signals.

Figure 5:
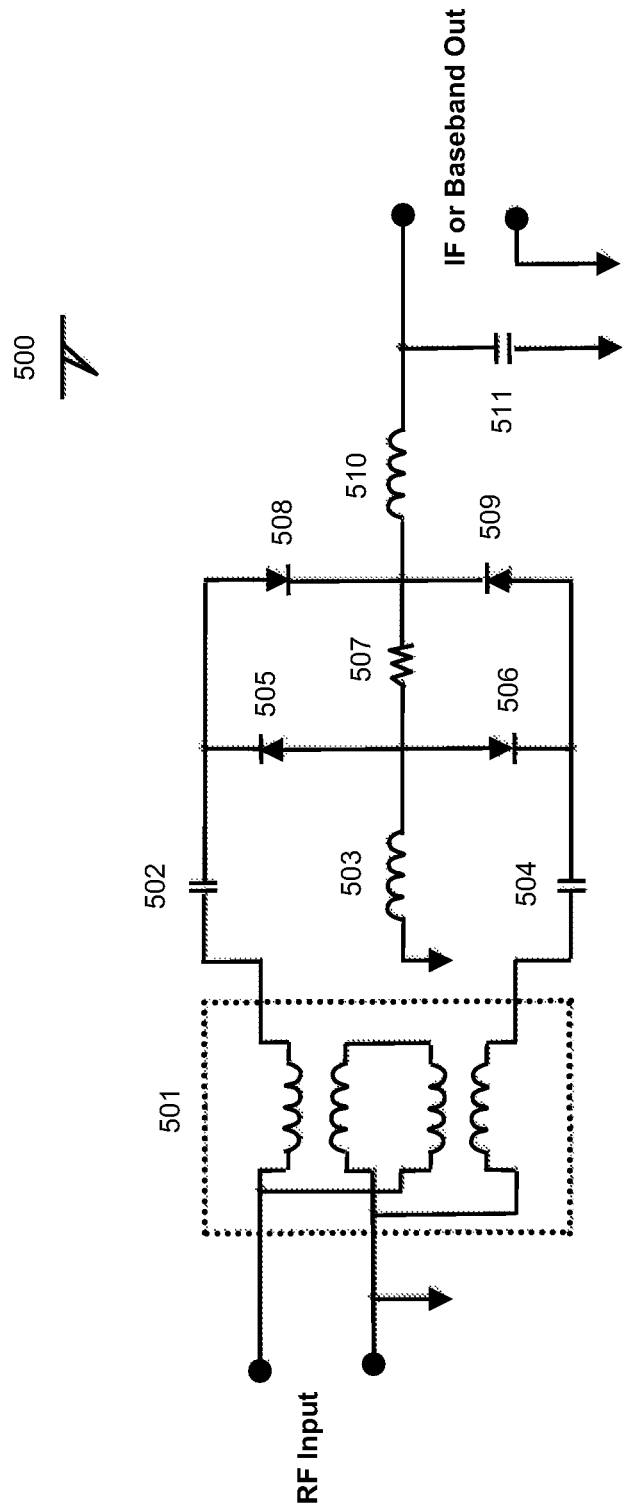
FIG. 5 shows one possible embodiment of a nonlinear electronic circuit that can be used in the low-power receiver to generate an intermediate frequency signal, or a baseband signal, from the superposition and mixing of two or more high frequency carrier signals.

FIG. 5 shows one possible embodiment of a nonlinear electronic circuit 500 that can be used in the low-power receiver to generate an IF frequency signal, or a baseband frequency signal, by the superposition and mixing of two or more high frequency carrier signals. The input to the nonlinear stage is labeled RF Input, and it receives the high frequency carriers from the antenna and band-pass filter (not shown in this diagram). A balun transformer 501 converts a single-ended signal to a differential signal, and provides an impedance transformation to increase the voltage level of the received signal. The differential signal comprised of the high frequency carriers is coupled to diodes 505, 506, 508 and 509. These diodes are configured to operate as a full-wave rectifier, and develop an output signal across load resistor 507. Capacitors 502 and 504 serve to block direct current flow, and also present a high impedance to block the generated IF or baseband output signal, but allow the high frequency carrier signals to couple from the balun transformer to the diodes. The nonlinear behavior of the full wave rectifier results in the desired intermediate frequency (IF) signal, or baseband signal, being developed across load resistor 507. Inductors 503 and 510 present a high impedance to the high frequency carriers, but allow the desired IF output signal, or baseband output signal, to pass with minimal attenuation. Inductor 503 also provides a ground return path for the IF or baseband output signal. The desired IF output signal, or baseband signal, is available at the terminals labeled IF or Baseband Out. Capacitor 511, in conjunction with inductor 503 and inductor 510, operates as a low-pass filter to attenuate the high frequency carriers, and the unwanted mixing product resulting from the sum of the two carriers (Fsum). The cutoff frequency of this output filter section can be adjusted to accommodate the desired output frequency of the IF, or baseband output signal, by adjusting the component values accordingly.

It should be noted that this is only one of many possible methods for implementing a nonlinear circuit to develop the desired IF signal or baseband signal from the high frequency carrier input signals. For example, the input balun transformer could be replaced with an inductor-capacitor network to provide impedance transformation and/or convert a single-ended signal to a differential signal. Also, if the nonlinear circuit was coupled to the output terminals of a dipole antenna, the balun stage would not be needed since a dipole antenna produces a signal output that is already in a differential form. It is also possible to implement the nonlinear circuit using a single diode such that single-ended to differential conversion is not required and the need for a balun can be eliminated. Furthermore, there are techniques know in the present art for producing nonlinear operation using other diode configurations, such as "half bridge" configuration, and the "ring quads" configuration as found in conventional double-balanced mixers. Zero-bias Schottky diodes, with very low barrier potential, result in good signal sensitivity and conversion efficiency, however, other diode types can be used and will result in varying degrees of circuit performance. Tunnel diodes and Back diodes and also be used, but they are significantly more expensive than Schottky diodes.

Figure 6:
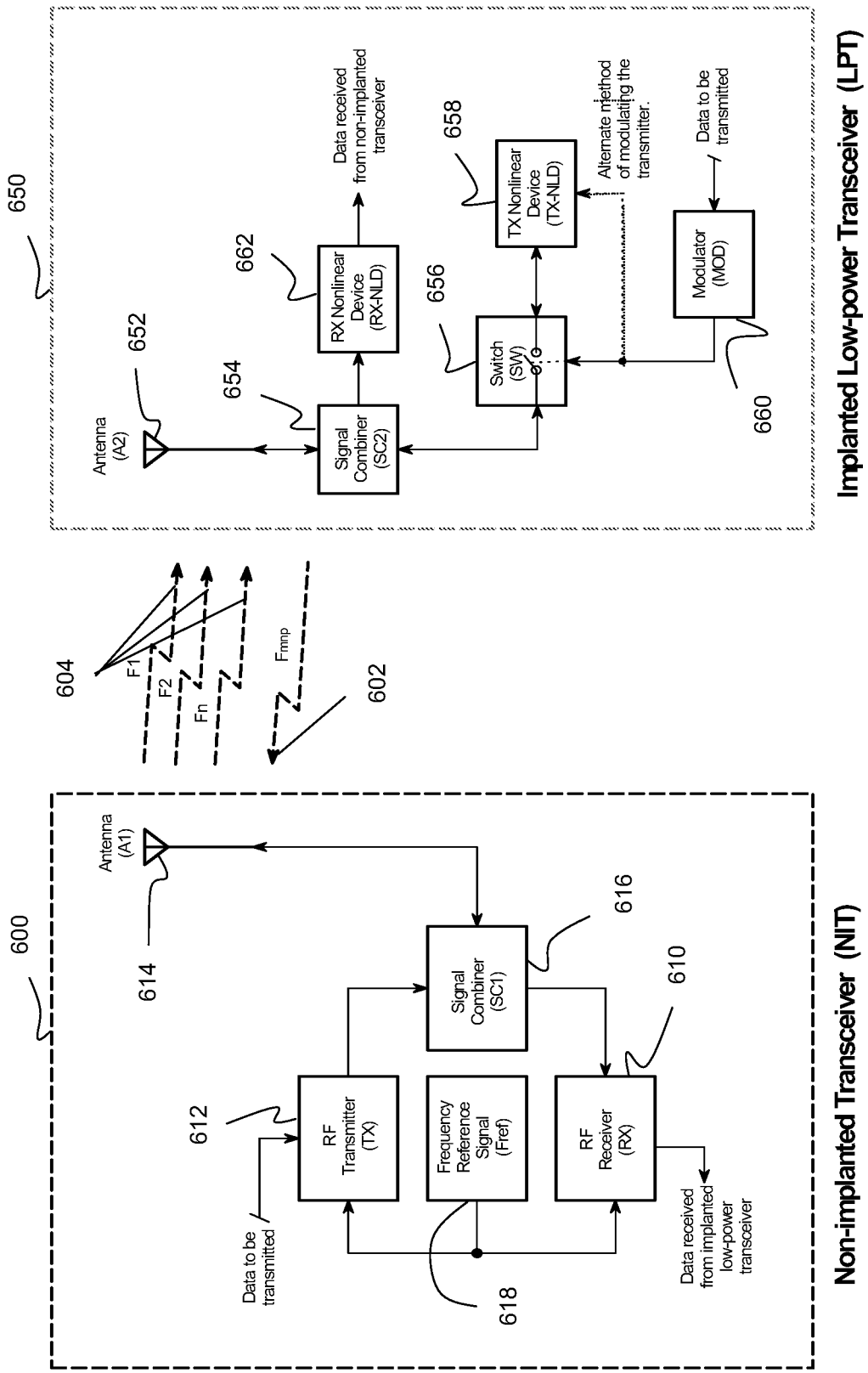
FIG. 6 shows a wireless communications system designed for a low-power transceiver.

In FIG. 6 a block diagram of the wireless communications system designed for a low-power transceiver is shown. Although this invention can be used in numerous non-medical applications, the following disclosure describes how the system could be used to implement a wireless telemetry link between an implanted medical device, such as a pacemaker, and a non-implanted device, such as a physician's programmer.

The elements contained within the dashed lines on the left side of FIG. 6 are functional blocks of an RF transceiver 600 that could be included in the non-implanted device. Since this transceiver is not implanted, and power consumption and size are not overly critical, it can be implemented using conventional RF transceiver architectures and techniques. The elements contained within the dashed lines on the right side of FIG. 6 form a low-power transceiver 650 that could be incorporated in a medical implant. Since low power consumption and small physical size are critical design requirements for medical implants, the design of the wireless communications system stated herein is focused on achieving these attributes in the implanted transceiver.

FIG. 6 also shows RF communications signals 602, 604 between the non-implanted transceiver (NIT) 600 and the implanted low-power transceiver (LPT) 650. The carrier signal transmitted by the LPT 650 to the NIT 600 is shown as the dashed line labeled Fmnp 602. The carrier signals transmitted by the NIT 600 to the LPT 650 are shown as dashed lines labeled F1, F2, . . . Fn 604. Multiple dashed lines are shown for these signals to indicate that they are transmitted simultaneously from the NIT 600 to the LPT 650.

To gain an understanding of how the invention operates, the following disclosure will describe the theory of operation of the LPT 650 and NIT 600 separately, operating in both transmit and receive modes.

Theory of Operation—LPT Transmitter

The following description details the operation of the LPT 650 operating as a transmitter, i.e. transmitting an RF carrier that may be modulated with patient data, or implant status information, or both, to the NIT 600.

The principle mechanism governing the operation of the LPT 650 when operating as a transmitter is that when multiple RF carrier signals 604, at frequencies F1, F2, F3, . . . etc., are simultaneously applied to an electronic circuit with a strong nonlinear transfer function, additional RF signals 602 are created at frequencies $F_{mnp}=|\pm mF1 \pm nF2 \pm pF3 \ldots|$ where m, n, p, etc. are integers (theoretically, m, n, p . . . range from 0 to infinity).

Figure 7:
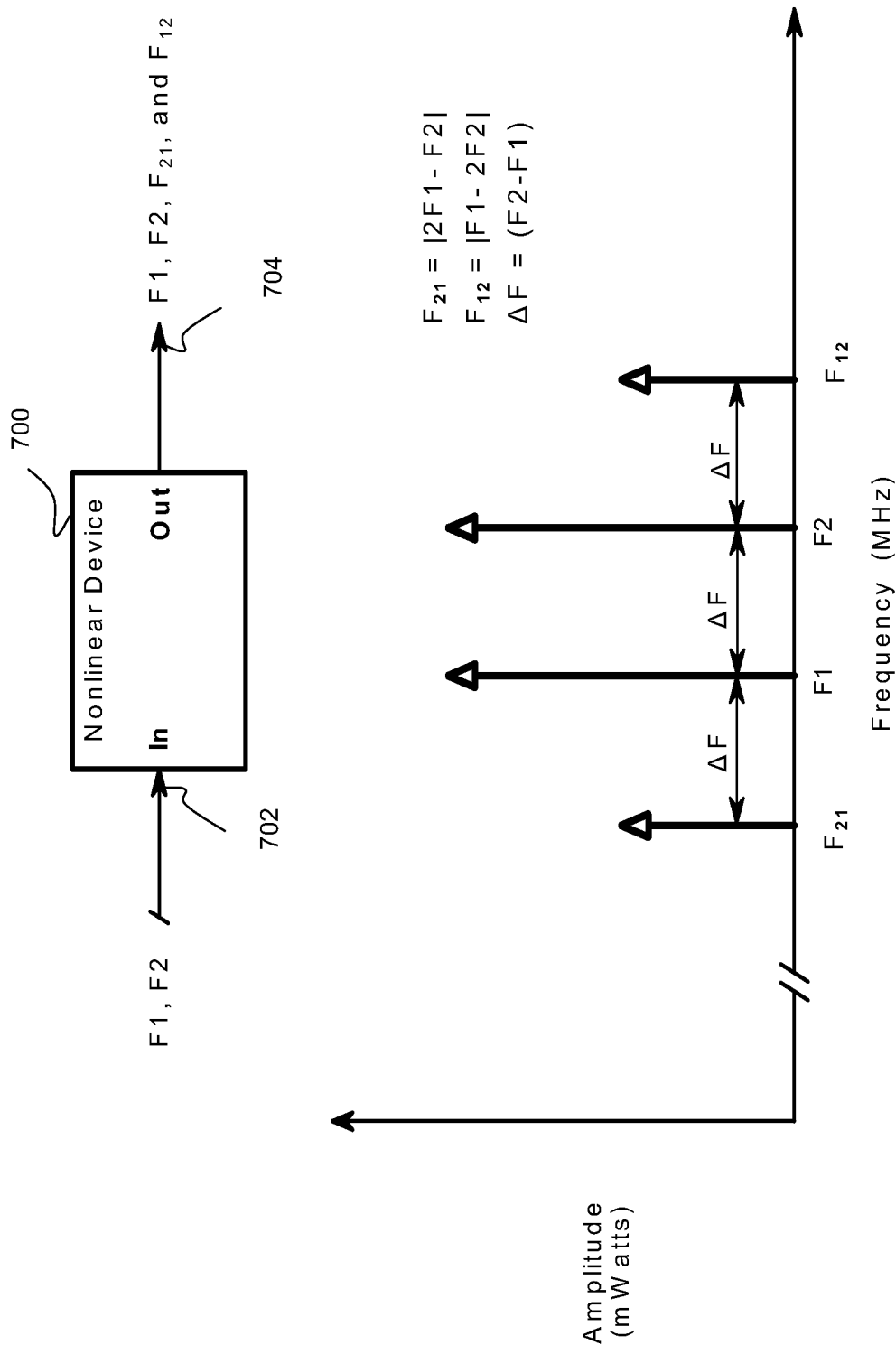
FIG. 7 shows a signal spectrum for two signals (F1 and F2) applied to a device with a nonlinear transfer function.

In the special case where two signals 702, (F1 and F2), are simultaneously applied to a nonlinear circuit 700, several frequencies 704 are generated as shown in FIG. 7. Of particular interest are the signals created at frequencies $F_{12}=|F1-2F2|$ and $F_{21}=|2F1-F2|$. Note that $F_{12}$ and $F_{21}$ are at frequencies above and below F2 and F1 by $\Delta F=(F2-F1)$.

By appropriately choosing frequencies F1 and F2, the signal components $F_2$, and $F_{12}$ can be advantageously located in the radio spectrum such that they can be easily distinguished from F1 and F2, yet close enough to fall within the same RF band as F1 and F2. Because the frequencies of $F_{21}$ and $F_{12}$ are relatively close to F1 and F2, they will couple back into the antenna and radiate just as if they were created by separate oscillator circuitry or signal sources in the nonlinear device 700.

The LPT 650 operates as a transmitter using the aforementioned technique of generating new signals at $F_{21}$ and $F_{12}$. The two signals F1 and F2 are radiated by the NIT 600 and received by the LPT antenna (A2) 652 as shown in FIG. 6. The signals are then coupled from the LPT's antenna 652, via a linear Signal Combiner (SC2) 654, to Switch (SW) 656 and the TX Nonlinear Device (TX-NLD) 658. The Signal Combiner (SC2) 654 can be replaced by a switch to connect either the low-power receiver 662 or the low-power transmitter (sections 656, 658 and 660) to the antenna (A2) 652. The section labeled TX-NLD 658 is a nonlinear device that generates $F_{21}$ and $F_{12}$ from received signals F1 and F2. As outlined above, $F_{21}$ and $F_{12}$ are coupled back to the antenna A2 652, (via Switch SW 656 and Signal Combiner SC2 654), and are radiated out of the LPT 650. An RF-Receiver RX 610 tuned to $F_{21}$ or $F_{12}$ can receive these signals. By using Switch (SW) 656 to connect and disconnect the TX Nonlinear Device (TX-NLD) 658 to the LPT's antenna 652, in accordance with the state of a binary digital data signal, the LPT 650 can transmit data to the NIT 600. When Switch SW 656 is in the closed state, signals at $F_{21}$ and $F_{12}$ are generated and subsequently transmitted. When Switch SW 656 is in the open state, no signals are generated (or transmitted) at $F_{21}$ and $F_{12}$. The presence/absence, of a signal at $F_{21}$ (or $F_{12}$) effectively implements ON-OFF Keying of an RF carrier that is modulated by digital data from the LPT 650.

As an alternative to controlling the Switch (SW) 656 to produce OOK modulation, the data signal could also modulate, or alter, the characteristics of the TX-NLD's 658 nonlinear transfer function. This approach could further simplify the LPT 650 circuitry by eliminating Switch SW 656. By modulating, or altering, the TX-NLD's 658 nonlinearity in accordance with the data signal, amplitude modulation (AM), and/or OOK modulation, can be produced. In the LPT 650, the section labeled Modulator (MOD) 660 would also provide any necessary level shifting of the data signal to a voltage level appropriate for controlling Switch (SW) 656 or the TX Nonlinear Device (TX-NLD) 658.

Figure 8:
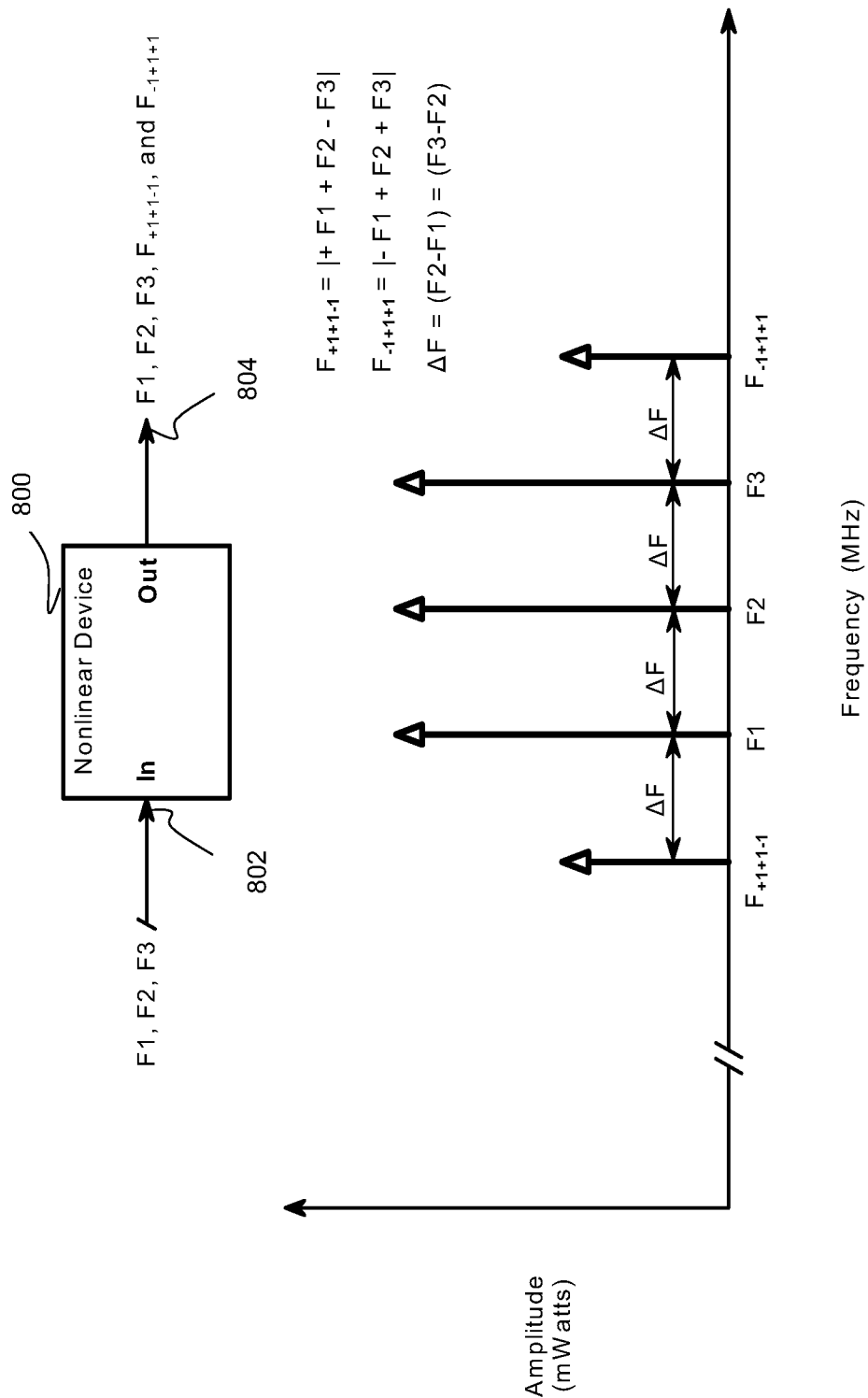
FIG. 8 shows a signal spectrum for three signals (F1, F2, and F3), with equal frequency separation, applied to a device with a nonlinear transfer function.

It should be noted that the LPT 650 could be implemented by transmitting more than two signals. For example, FIG. 8 shows how three signals (F1, F2, and F3) 802 can be used to transmit a signal from the LPT 650 to the NIT 600.

This system, using three signals 802, operates using the same principles as the system of FIG. 7 previously described. The only significant difference is that the signals transmitted by the LTP 650 are the result of different mixing products arising from the presence of the additional signal, F3, combining with F1 and F2 804 in the TX-NLD 800.

Using three RF carriers, (F1, F2, and F3) 802, the LPT 650 can transmit signals at: $F_{mnp}=|\pm mF1 \pm nF2 \pm pF3|$804. If the three carrier frequencies are equally spaced, i.e. $\Delta F=(F2-F1)=(F3-F2)$, then the nonlinear device will produce useful transmit signals for coefficient sets [m=+1, n=+1, p=−1] and [m=−1, n=+1, p=+1]. FIG. 8 shows the signal spectrum for this situation, with the signals at $F_{+1+1-}=|+F1+F2-F3|$ and $F_{-1+1+1}=|-F1+F2+F3|$ suitable for transmission of data from the LPT 650 to the RF-receiver RX 610 in the NIT.

It should be noted that the majority of the circuitry in the LPT 650 is passive and does not require a source of DC power to operate. The only DC power required is that necessary to modulate signals $F_{21}$ and $F_{12}$ (or, in general terms: $F_{mnp}$) with the data signal to be transmitted. Since this function consumes very little power, the LPT 650 consumes very little power from the implant's battery when it is transmitting. This is a considerable advantage over conventional transmitter architectures.

Transmitting FSK Signals:

The above description detailed the operation of the LPT's transmitter based upon utilizing two signals, (or three equally spaced signals), to produce an OOK or AM modulated signal. By employing three signals with asymmetrical frequency spacing, the LPT's transmitter can transmit an FSK modulated signal. Although this requires a third signal source in the NIT 600, FSK-based telemetry systems offer improved link margin and link reliability over AM and OOK systems when the communications channel is impaired by impulse noise.

Figure 9:
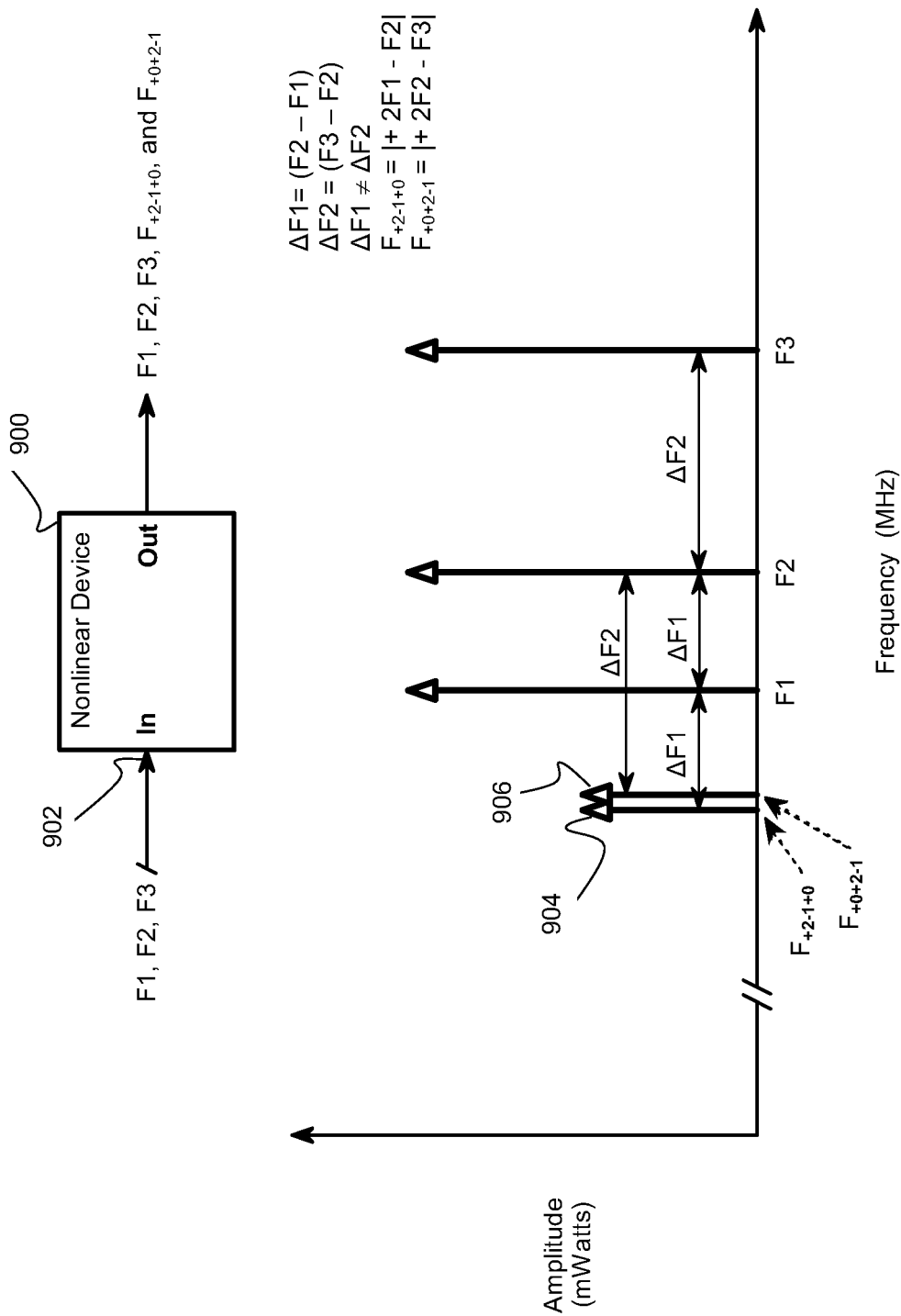
FIG. 9 shows a signal spectrum for three signals (F1, F2, and F3), with unequal frequency separation, applied to a device with a nonlinear transfer function.

FIG. 9 shows the signal spectrum for three carriers 902, with asymmetrical frequency spacing, transmitted from the NIT 600 to the LPT 650. For carriers F1, F2, and F3: $\Delta F1=(F2-F1)$, $\Delta F2=(F3-F2)$, and $\Delta F1 \neq \Delta F2$. The signals of interest that are transmitted by the LPT are the two signals at $F_{+2-1+0}$ 904 and $F_{+0+2-1}$ 906.

Note that $F_{+3-1+0}=|+2F1-F2|$ 904 and $F_{+0+2-1}=|+2F2-F3|$ 906 are very close in frequency, and $F_{+2-1+0}$ 904 is the result of the mixing of only F1 and F2, while $F_{+0+2-1}$ 906 is the result of the mixing of only the F2 and F3 signals. With three signals 902 transmitted by the NIT 600, the LPT 650 can transmit an FSK signal, comprised of the two signals $F_{+2-1+0}$ and $F_{+0+2-1}$, by selectively filtering the frequency pair F1 and F2, or F2 and F3, and applying only the desired selected frequency pair to the TX Nonlinear Device (TX-NLD) 900. This frequency pair selection can be implemented using bandpass filters to select the desired two signals, or using a notch-filter to remove the unwanted signal (F1 or F3) as necessary. The frequency selection and filtering can be included as a part of Switch SW 656, as indicated in the LPT 650 section of FIG. 6.

The following is an example of one possible method for implementing FSK data transmission from the LPT 650 using the aforementioned technique. Consider the case where the NIT 600 transmits three signals to the LPT 650 that have the following frequencies:

F1=914.00 MHz
F2=915.00 MHz
F3=916.99 MHz

In the LPT 650, bandpass filters, or notch filters, are used to selectively apply the frequency pairs of either F1 and F2, or F2 and F3, to the nonlinear device TX-NLD 900. If the F1 and F2 pair are assigned to represent a logic state of "0", and the F2 and F3 pair represent the logic state of "1" (the two states representing a binary data bit), then the LPT will transmit a signal at $F_{+2-1+0}=|+2F1-F2|=913.00$ MHz 904 for a logic "0", and it will transmit a signal at $F_{+0+2-1}=|+2F2-F3|=913.01$ MHz 906 for a logic "1". Because these two frequencies represent two distinct logic states, the LPT 650 has effectively transmitted an FSK modulated signal. Also note that the FSK frequency separation, i.e. $\Delta F_{pp}=F_{+0+2-1}-F_{+2-1+0}$, is determined by the frequency relationship between F1, F2, and F3. In this example, a narrow frequency separation was used, (10 kHz), to indicate that a narrowband FSK signal could be transmitted by the LPT 650. It is advantageous to utilize narrowband FSK data transmission in medical telemetry applications because the amplitude of the signals at $F_{+}2-1+0$ 904 and $F_{+0+2-1}$ 906 are very weak, and narrowband FSK receivers with excellent sensitivity are readily available for the NIT 600. It should be noted that the frequencies used in this example were chosen only to demonstrate the principle of operation of the invention, and other frequencies can be used to implement the invention in the same, or other, radio frequency band(s).

Depending upon the frequencies chosen for the carriers F1, F2, and F3; high-Q crystal, ceramic, SAW, or MEMS resonators, could be employed to implement the bandpass or notch filters employed in the LPT FSK transmitter.

Still another approach, when transmitting more than two carriers, is to selectively switch between two different nonlinear devices connected to the antenna of the LPT 650. Using different nonlinearities to generate different mixing products will also result in an FSK-modulated signal.

Figure 10:
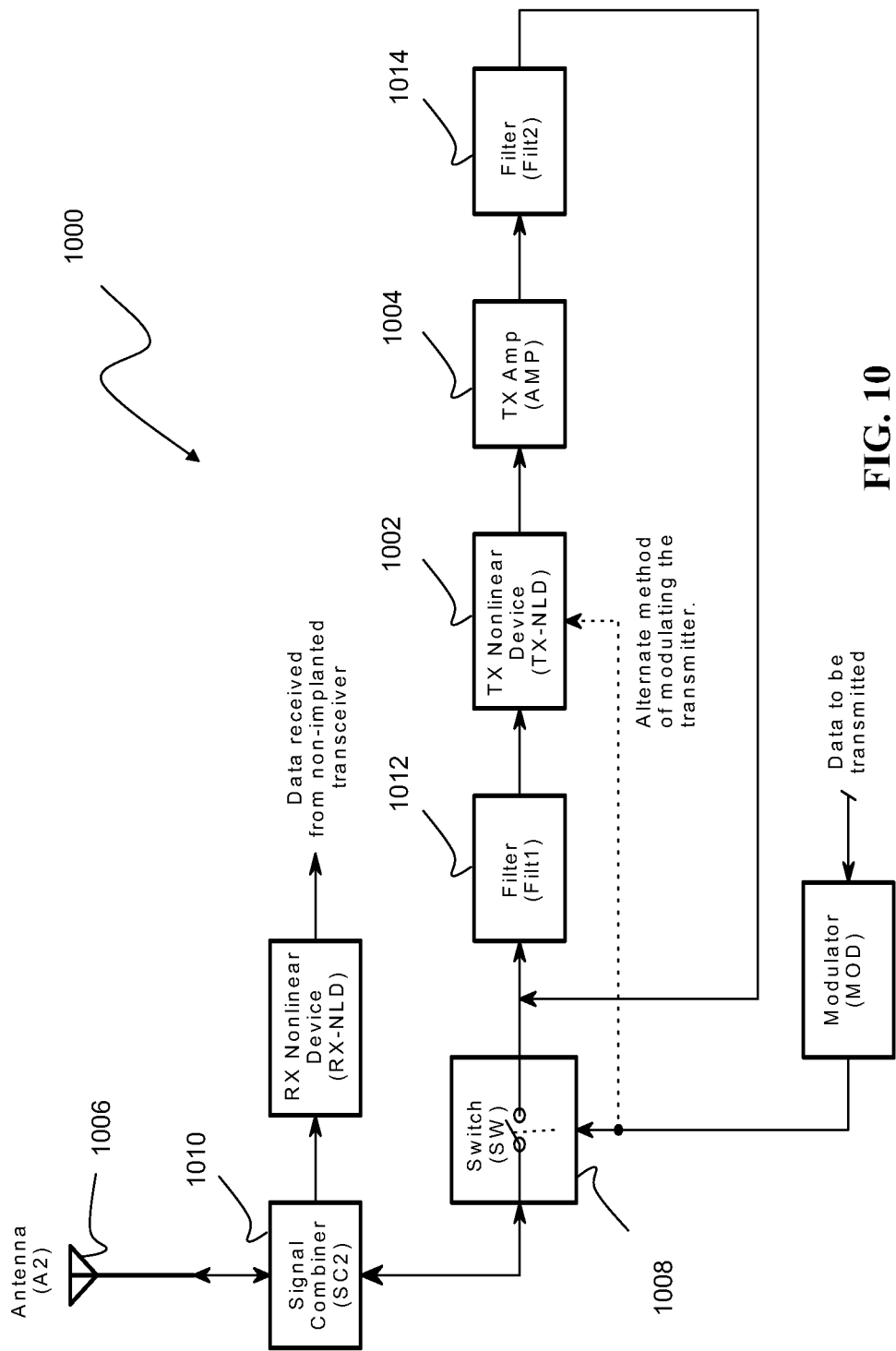
FIG. 10 shows an Implantable low-power transceiver with a TX amplifier to increase the operating range.

Extending the Operating Range With an Implant Transmitter Amplifier:

In some applications it may be desirable to extend the operating range between the LPT 1000 and NIT 600. Since the signal transmitted by the LPT 1000 is at a very low level, it may be advantageous to boost its level to increase the signal-to-noise ratio at the NIT's receiver 610. This can be accomplished, as shown in FIG. 10, by coupling an RF amplifier to the TX-NLD 1002 section. Alternatively, the amplifier can be incorporated as part of the TX-NLD 1002, using its nonlinearity characteristics to generate the desired transmit signal.

In FIG. 10, the output of amplifier (TX AMP) 1004 is shown coupled back to Antenna A2 1006 via Switch (SW) 1008, but it could also be coupled back to the Antenna A2 1006 through the Signal Combiner SC2 1010. To prevent feedback of the amplifier's 1004 output signal into the amplifier's 1004 input port, two filters (Filt1 1012 and Filt2 1014) may also be included in the LPT's transmitter. Filter Filt1 1012 must pass the carriers transmitted by the NIT 600 to the LPT 1000, and attenuate the signal(s) generated by the TX-NLD 1002. Filter Filt2 1014 must pass the LTP signal(s) generated by the TX-NLD 1002, and attenuate the carriers transmitted by the NIT 600. Alternatively, amplifier (AMP) 1004 may be a tuned amplifier with a bandpass characteristic such that it provides gain at the LPT transmitter signal frequencies. It is important that precautions be taken to ensure amplifier AMP 1004 does not become unstable and self-oscillate due to positive feedback within the loop created by the Filt1 1012, TX-NLD 1002, AMP 1004, and the Filt2 1014 stages. Note that Filt1 1012 and Filt2 1014 are optional. Also note that the output of the TX Amp (AMP) 1004 could be connected to a separate antenna instead of connecting it back into antenna A2 1006.

Theory of Operation—LPT Receiver

As shown in FIG. 6, the LPT 650 also includes a low-power receiver to receive control signals, data, or other information 604 transmitted from the NIT 600. The LPT's receiver can receive data from the NIT 600 while it is simultaneously transmitting data 602 to the NIT 600, that is, it can operate in full duplex mode; or it can receive data and other signals from the NIT 600 when the LPT 650 is not transmitting, i.e. operating in half-duplex mode.

The signal 604 to the LPT's antenna (A2) 652 is coupled to the RX Nonlinear Device (RX-NLD) 662 via the linear Signal Combiner (SC2) 654. The LPT's receiver utilizes multiple carriers simultaneously transmitted by the NIT 600 in order to simplify its architecture and minimize its power consumption. The theory of operation of the LPT's receiver is as previously described with respect to the FIGS. 3 and 4.

Theory of Operation—NIT Transmitter

The following description details the operation of the NIT 600 operating as a transmitter, i.e. transmitting signals 604 from the NIT 600, which may contain information such as control signals and/or data 604, to the LPT 650.

As shown in FIG. 6, the transmitter section of the NIT 600, labeled RF Transmitter (TX) 612, is comprised of multiple signal sources F1, F2, . . . Fn. The signal sources may be phase locked to a Frequency Reference Signal (Fref) 618 that may also be provided to the receiver section of the NIT 600 as well. The theory of operation of the NIT's transmitter 612 is exactly as previously described above with respect to the FIGS. 1 and 2. To avoid repeating the details of the low-power receiver's operation, please refer to previous description.

Because this transmitter 612 is not implanted, and it is typically powered from the AC mains, low-power, and high-efficiency operation are not critical design requirements. The transmitter 612 may be implemented using conventional transmitter architectures and techniques. Also, note that the outputs of the multiple signal sources may be combined into a single antenna 614 using a linear Signal Combiner (SC1) 616 as shown in FIG. 6, or multiple antennas may be employed.

Theory of Operation—NIT Receiver

The following description details the operation of the NIT 600 operating as a receiver, i.e. receiving signals 602 from the LPT 650 that may contain information such as patient medical data, and/or implant status.

The Radio Receiver, (labeled RFReceiver RX 610 in FIG. 6), recovers the data transmitted by the low-power transceiver LPT 650. The receiver 610 may tune to any one of the multiple signals generated by the LPT's transmitter at $F_{mnp}=|\pm mF1\pm nF2\pm pF3\pm \ldots |$ 602, where m, n, p, . . . are integers ranging from 0 to infinity, and F1, F2, F3, . . . are the frequencies of the carriers simultaneously transmitted by the NIT's transmitter 612.

Because this receiver 610 is not implanted, and it is typically powered from the AC mains, low-power, and high-efficiency operation are not critical design requirements. The receiver 610 may be implemented using conventional receiver architectures (such as the super-heterodyne) and techniques. The receiver may be designed to utilize amplitude modulation (AM), On-Off Keying modulation (OOK), or frequency shift keying (FSK), or any combination thereof.

By phase-locking the receiver 610 and signal sources (F1, F2, . . . Fn) 604 to the same reference oscillator 618, the receiver 610 can tune exactly to the desired signal transmitted by the LPT 650. If desired, the receiver's antenna may be separate from the NIT's transmitting antenna(s), or it may be combined into a single unit 614 as shown in FIG. 6.

Spread Spectrum Mode of Operation

The wireless communications system designed for a low-power transceiver could employ frequency hopping spread spectrum techniques for carrier signals F1, F2, . . . etc. The method to accomplish this for the NIT 600 to LPT 650 transmission link has already been outlined on pages 11 and 12 of this disclosure. For the LPT-to-NIT communications link, the NIT's receiver (RX) 610 would be required to synchronize with the spread spectrum frequency hopping protocol utilized by the NIT's signal sources 612 to ensure the desired LPT signal 602 is recovered.

Although an exemplary embodiment of the present invention has been shown and described, it should be apparent to those of ordinary skill that a number of changes and modifications to the invention may be made without departing from the spirit and scope of the invention. This invention can readily be adapted to such devices by following the present teachings. All such changes, modifications and alterations should therefore be recognized as falling within the scope of the present invention.

What is claimed is:

1. A low power receiver, comprising:
an antenna;
a resonant circuit;
a nonlinear device, wherein said antenna forms said resonant circuit or a part of said resonant circuit, or is directly or indirectly coupled to said resonant circuit;
said antenna and said resonant circuit tuned to receive a first high frequency carrier of a predetermined first frequency F1 and a second high frequency carrier of a predetermined second frequency F2 simultaneously, which differ from each other by a predetermined intermediate or baseband frequency Fout =|F2−F1|, wherein said nonlinear device is directly or indirectly connected to said resonant circuit and configured to generate an intermediate frequency signal or a baseband signal, respectively, of frequency Fout, wherein said low power receiver is configured to operate according to a heterodyne principle to down convert a high frequency signal to said intermediate frequency signal or said baseband signal, respectively, via a mix of said first high frequency carrier and said second high frequency carrier to thus regain said intermediate frequency signal without a local oscillator;
a second nonlinear device coupled to the antenna, said second nonlinear device comprising a signal input configured to receive signals having at least two different frequencies that include said predetermined first frequency F1 and said predetermined second frequency F2 and a signal output, said second nonlinear device configured to generate at least signals having two further frequencies $F_{21}$ and $F_{12}$ from received signals of said predetermined first frequency F1 and said predetermined second frequency F2 and to couple the signals having said two further frequencies $F_{21}$ and $F_{12}$ back to said antenna to transmit data out of said antenna; and,
wherein said low power receiver is configured to reside within an implantable device configured to be implanted in a body of a mammal and wherein said implantable medical device is a pacemaker, a cardioverter/defibrillator, or a combination thereof.

2. The low power receiver according to claim 1, wherein said low power receiver is configured to directly generate said baseband signal that represents transmitted data.

3. The low power receiver according to claim 1, wherein said low power receiver is configured to generate said intermediate frequency signal and to convert said intermediate frequency signal to said baseband signal that represents transmitted data.

4. The low power receiver according to claim 1, wherein said intermediate frequency signal or said baseband signal have a frequency in a range between 0 Hz and 1 MHz.

5. The low power receiver according to claim 1, wherein said first and said second high frequency carriers are not modulated and said low power receiver is configured to mix said first and said second high frequency carriers within said antenna, or in a separate mixer, or in another nonlinear device, to obtain said intermediate frequency signal or said baseband frequency signal, which is a data signal to be received.

6. The low power receiver according to claim 1, wherein said first or said second high frequency carrier is a reference carrier, which is not modulated, and another high frequency carrier is modulated with a data signal, and said low power receiver is configured to mix said reference carrier with said other high frequency carrier within said antenna, or in a separate mixer, or in another nonlinear device, to obtain said intermediate frequency signal or said baseband signal, which is a desired data signal to be received.

7. The low power receiver according to claim 1 which comprises a first band-pass filter, that is connected at least indirectly to said antenna, said first band-pass filter having a pass band that corresponds to said first and second high frequency carriers.

8. The low power receiver according to claim 7 which comprises a second band-pass filter, or a low-pass filter, that is connected to an output of said nonlinear device, said second band-pass filter, or said low-pass filter, comprising a pass band corresponding to said intermediate frequency or said baseband frequency.

9. The low power receiver according to claim 8 wherein said second band-pass filter is connected to an intermediate frequency amplifier or IF amplifier, or a baseband amplifier, and said low power receiver is configured to filter and to amplify said intermediate frequency signal or baseband signal.

10. The low power receiver according to claim 9, wherein said nonlinear device or said intermediate frequency amplifier, or said baseband amplifier further comprises and is connected to a level detector circuit, and said low power receiver is configured to analyse a level of said intermediate frequency signal, or baseband signal, or a filtered and amplified intermediate frequency or baseband signal, with said level detector circuit, and to produce a wakeup signal depending on a predetermined level of said intermediate frequency or baseband signal, or said filtered and amplified IF or baseband signal, with said level detector circuit.

11. The low power receiver according to claim 9, wherein said nonlinear device, or said IF amplifier or said baseband amplifier, is connected to a data detection circuit, and said low power receiver is configured to convert said intermediate frequency or baseband signal, or said filtered and amplified IF or baseband signal, with said data detection circuit into a digital data signal and to output a digital signal.

12. The low power receiver according to claim 1 further comprising a high frequency amplifier, which is connected to said antenna or said resonant circuit, said high frequency amplifier configured to amplify said first and second high frequency carriers.

13. The low power receiver according to claim 1, wherein said low power receiver is configured to simultaneously receive more than two high frequency carriers at different frequencies and to obtain an output signal from intermodulation products, produced by a nonlinear mix of said more than two high frequency carriers.

14. The low power receiver according to claim 1, wherein said nonlinear device comprises a single diode, an array of diodes, or a switching device, or a device with a strong $2^{nd}$ order transfer function, or in a case of more than two carriers, a device with a strong $3^{rd}$ order transfer function.

15. The low power receiver according to claim 1, wherein said low power receiver is configured to receive spread spectrum carriers.

16. The low power receiver according to claim 1, wherein said receiver is configured to receive at least two pairs of redundant high frequency carriers and a first pair of high frequency carriers having a difference in frequency, which is equal to a difference in frequency of a second pair of high frequency carriers.

17. The low power receiver according to claim 1, wherein said receiver is configured to receive at least two pairs of high frequency carriers, and a frequency difference of said at least two pairs of high frequency carriers differ from each other, and wherein said receiver is further configured to generate two separate intermediate frequency signals at different frequencies from said two pairs of high frequency carriers representing two different data signals.

18. The low power receiver according to claim 1, wherein said low power receiver is configured to demodulate an amplitude-modulated signal, frequency modulated signal, phase modulated signal, or QAM modulated signal.

19. The low power receiver according to claim 1, further comprising a linear signal combiner and a switch connected in series between said antenna and said second nonlinear device.

20. The low power receiver according to claim 19, further comprising a modulator connected to said switch and configured to open and to close said switch to generate digitally coded signals via on-off-keying (OOK).

21. The low power receiver according to claim 1, further comprising a modulator connected to said nonlinear device in order to alter nonlinearity of the nonlinear device in accordance with a digital data signal to generate an amplitude modulated or AM signal according to data to be transmitted.

22. The low power receiver according to claim 1, wherein said low power receiver is configured to receive three signals with asymmetrical frequency spacing in order to generate a frequency-shift-keyed or FSK signal to be transmitted.

23. The low power receiver according to claim 22, further configured to selectively filter a frequency pair F1 and F2, or F2 and F3, and to apply only a desired selected frequency pair to the second nonlinear device.

24. The low power receiver according to claim 23, wherein the frequency pair selection is utilizes bandpass filters to select a desired two signals.

25. The low power receiver according to claim 24, wherein the frequency pair selection is utilizes a notch-filter to remove an unwanted signal.

26. The low power receiver according to claim 19 further configured to selectively filter a frequency pair F1 and F2, or F2 and F3, and to apply only a desired selected frequency pair to the second nonlinear device or wherein bandpass filters are configured to selectively filter and select a desired two signals to apply to the second nonlinear device and wherein the frequency selection and filtering is included as a part of said switch.

27. The low power receiver according to claim 24 wherein bandpass filters are utilized to selectively filter and select a desired two signals to apply to the nonlinear device, wherein the bandpass filter or notch filters are utilize high-Q crystal, ceramic, SAW, or MEMS resonators.

28. The low power receiver according to claim 23, further comprising two different nonlinear devices and configured to selectively switch between said two different nonlinear devices connected to said antenna to generate different mixed products that result in an FSK-modulated signal to be transmitted.

29. The low power receiver according to claim 1, further comprising an RF amplifier connected to the second nonlinear device.

30. The low power receiver according to claim 1, further comprising a RF amplifier that is incorporated as part of the second nonlinear device, wherein nonlinearity characteristics of said nonlinear device are utilized to generate a desired transmit signal.

31. The low power receiver according to claim 1, wherein said nonlinear device and said second nonlinear device are connected to said antenna via a switch for selective connection of said nonlinear device or said second nonlinear device to said antenna.

32. The low power receiver according to claim 1, wherein said receiver is configured to receive at least two pairs of redundant high frequency carriers and a first pair of high frequency carriers having a difference in frequency, which is equal to a difference in frequency of a second pair of high frequency carriers.

33. The low power receiver according to claim 1, wherein said receiver is configured to receive at least two pairs of high frequency carriers, and a frequency difference of said at least two pairs of high frequency carriers differ from each other, and wherein said receiver is further configured to generate two separate intermediate frequency signals at different frequencies from said two pairs of high frequency carriers representing two different data signals.

* * * * *